United States Patent
Kim et al.

(10) Patent No.: US 10,687,349 B2
(45) Date of Patent: *Jun. 16, 2020

(54) METHOD AND APPARATUS FOR REQUESTING SCHEDULING IN WIRELESS COMMUNICATION SYSTEM

(71) Applicant: LG ELECTRONICS INC., Seoul (KR)

(72) Inventors: Kitae Kim, Seoul (KR); Eunjong Lee, Seoul (KR); Giwon Park, Seoul (KR); Jaehoon Chung, Seoul (KR); Jiwon Kang, Seoul (KR); Hyeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,244

(22) Filed: Dec. 3, 2018

(65) Prior Publication Data
US 2019/0104538 A1 Apr. 4, 2019

Related U.S. Application Data

(63) Continuation of application No. 15/326,994, filed as application No. PCT/KR2015/002280 on Mar. 10, 2015, now Pat. No. 10,178,691.
(Continued)

(51) Int. Cl.
*H04W 72/12* (2009.01)
*H04W 28/02* (2009.01)
*H04W 72/04* (2009.01)

(52) U.S. Cl.
CPC ... *H04W 72/1284* (2013.01); *H04W 28/0278* (2013.01); *H04W 72/0413* (2013.01)

(58) Field of Classification Search
CPC ......... H04W 72/1278; H04W 72/1284; H04W 72/1289; H04W 72/1294; H04W 72/04;
(Continued)

(56) References Cited

U.S. PATENT DOCUMENTS 9,320,056 B2 4/2016 Uchino et al.
2007/0201397 A1* 8/2007 Zhang ..................... H04L 47/12
370/329
(Continued)

FOREIGN PATENT DOCUMENTS

KR 1020090034051 4/2009
KR 1020100082292 7/2010
(Continued)

OTHER PUBLICATIONS

Korean Intellectual Property Office Application No. 10-2016-7036481, Office Action dated Jan. 25, 2018, 5 pages.
(Continued)

*Primary Examiner* — Kevin D Mew
(74) *Attorney, Agent, or Firm* — Lee, Hong, Degerman, Kang & Waimey PC

(57) ABSTRACT

A method and apparatus for requesting scheduling in a wireless communication system is provided. The method requests scheduling for transmitting uplink data in a wireless communication system and may include transmitting, by user equipment (UE), a Scheduling Request (SR) of an SR type selected from multiple SR types to an eNB, receiving, by the UE, an uplink grant determined according to the selected SR type from the eNB, and transmitting, by the UE, uplink data to the eNB through a physical uplink shared channel (PUSCH) resource allocated by the uplink grant.

14 Claims, 24 Drawing Sheets

Related U.S. Application Data

(60) Provisional application No. 62/026,009, filed on Jul. 17, 2014.

(58) Field of Classification Search
 CPC ......... H04W 72/0406; H04W 72/0413; H04W 72/042; H04W 28/0278
 See application file for complete search history.

(56) References Cited

U.S. PATENT DOCUMENTS

| | | |
|---|---|---|
| 2009/0239568 A1 | 9/2009 | Bertrand et al. |
| 2010/0098011 A1* | 4/2010 | Pelletier ............ H04W 72/1242 370/329 |
| 2010/0115355 A1* | 5/2010 | Hsu ................... H04W 72/1284 714/726 |
| 2010/0208672 A1 | 8/2010 | Chun et al. |
| 2011/0249634 A1* | 10/2011 | Lee ................... H04W 72/0406 370/329 |
| 2012/0039263 A1* | 2/2012 | Moberg ............ H04W 72/1284 370/329 |
| 2012/0069793 A1* | 3/2012 | Chung ................. H04W 76/27 370/315 |
| 2012/0302274 A1 | 11/2012 | Ohta et al. |
| 2012/0320826 A1* | 12/2012 | Kim ....................... H04J 13/16 370/328 |
| 2012/0320951 A1* | 12/2012 | Han ..................... H04L 1/0041 375/141 |
| 2013/0083753 A1* | 4/2013 | Lee ....................... H04L 1/0026 370/329 |
| 2013/0163532 A1* | 6/2013 | Anderson ............. H04W 72/04 370/329 |
| 2013/0163534 A1 | 6/2013 | Anderson et al. |
| 2013/0163537 A1 | 6/2013 | Anderson et al. |
| 2013/0229998 A1* | 9/2013 | Noh ........................ H04L 5/001 370/329 |
| 2014/0029584 A1* | 1/2014 | Qu ..................... H04W 72/042 370/336 |
| 2014/0119313 A1* | 5/2014 | Yang ................. H04W 74/0833 370/329 |
| 2014/0226613 A1* | 8/2014 | Kim ...................... H04L 1/1896 370/329 |
| 2014/0307667 A1* | 10/2014 | Wager ................. H04W 74/006 370/329 |
| 2015/0009815 A1* | 1/2015 | Hsu .................... H04W 28/0221 370/230.1 |
| 2015/0180616 A1* | 6/2015 | Lee ....................... H04L 1/1812 370/329 |
| 2015/0201418 A1 | 7/2015 | Zhang et al. |
| 2015/0208386 A1 | 7/2015 | Yang et al. |
| 2015/0257144 A1* | 9/2015 | Hooli ................ H04W 72/0406 370/329 |
| 2015/0312930 A1 | 10/2015 | Han et al. |
| 2015/0341948 A1 | 11/2015 | Ratasuk et al. |
| 2017/0202009 A1 | 7/2017 | Kim et al. |
| 2017/0208584 A1 | 7/2017 | Qu et al. |

FOREIGN PATENT DOCUMENTS

| | | |
|---|---|---|
| WO | 2013108178 | 8/2010 |
| WO | 2013/139299 | 3/2013 |
| WO | 2014035301 | 3/2014 |

OTHER PUBLICATIONS

PCT International Application No. PCT/KR2015/002280, International Search Report dated Jun. 5, 2015, 6 pages.
U.S. Appl. No. 15/326,994, Notice of Allowance dated Aug. 27, 2018, 21 pages.
U.S. Appl. No. 15/326,994, Office Action dated Mar. 30, 2018, 20 pages.
Korean Intellectual Property Office Application No. 10-2016-7036481, Notice of Allowance dated Jul. 30, 2018, 2 pages.
Korean Intellectual Property Office Application No. 10-2018-7030054, Notice of Allowance dated Jul. 22, 2019, 2 pages.

* cited by examiner

[FIG. 1]
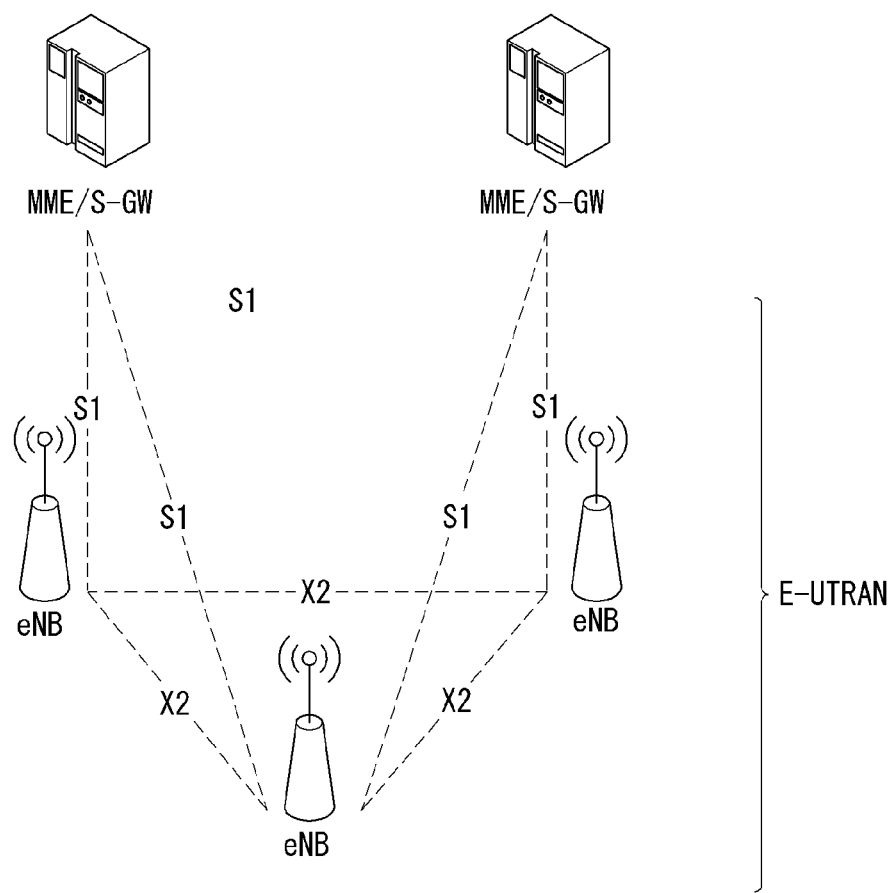

[FIG. 2]
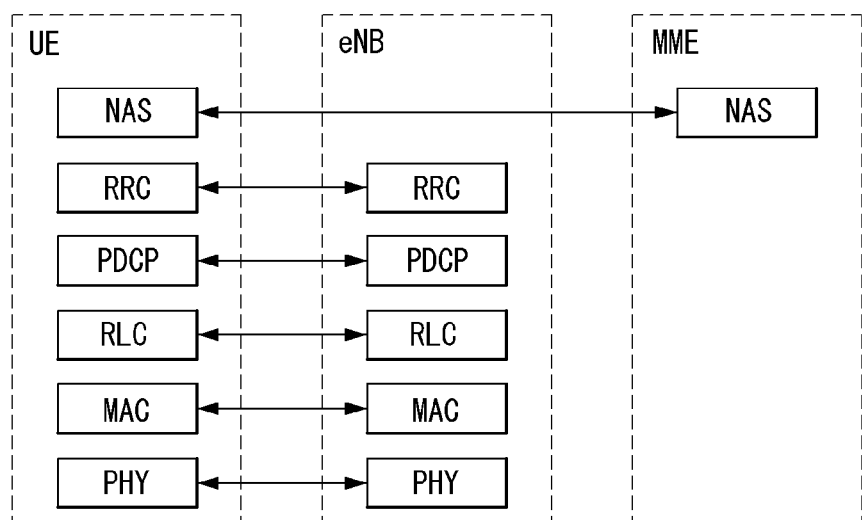
(a) Control plane protocol stack
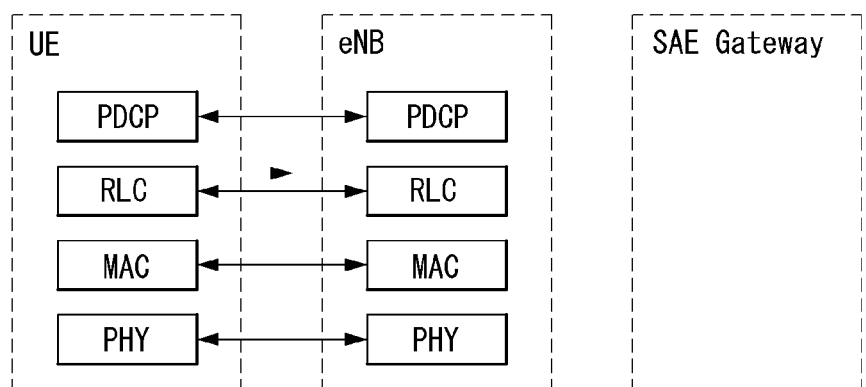
(b) User plane protocol stack

[FIG. 3]
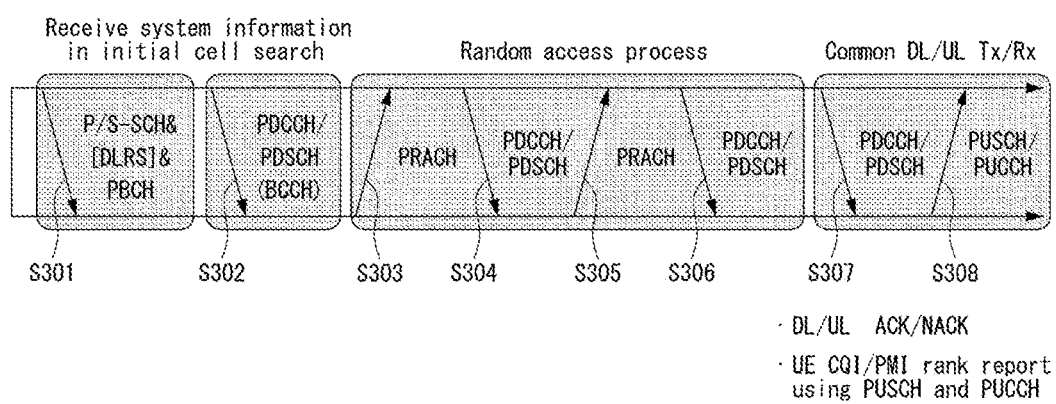

[FIG. 4]
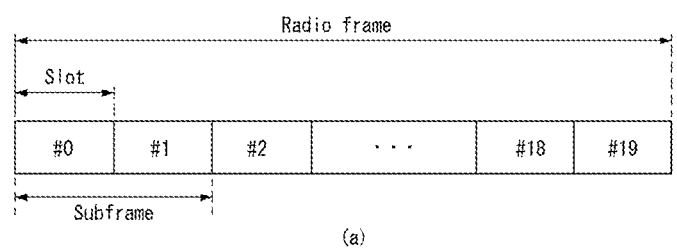
(a)
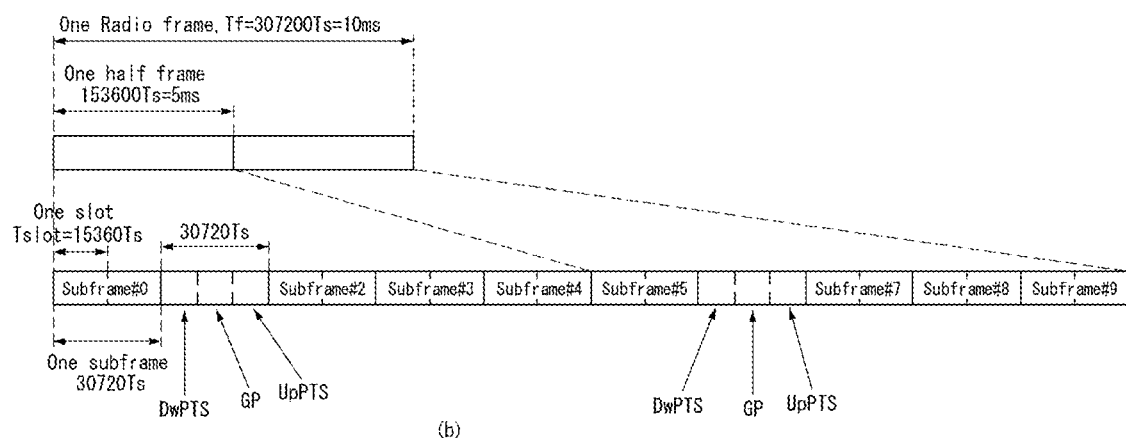
(b)

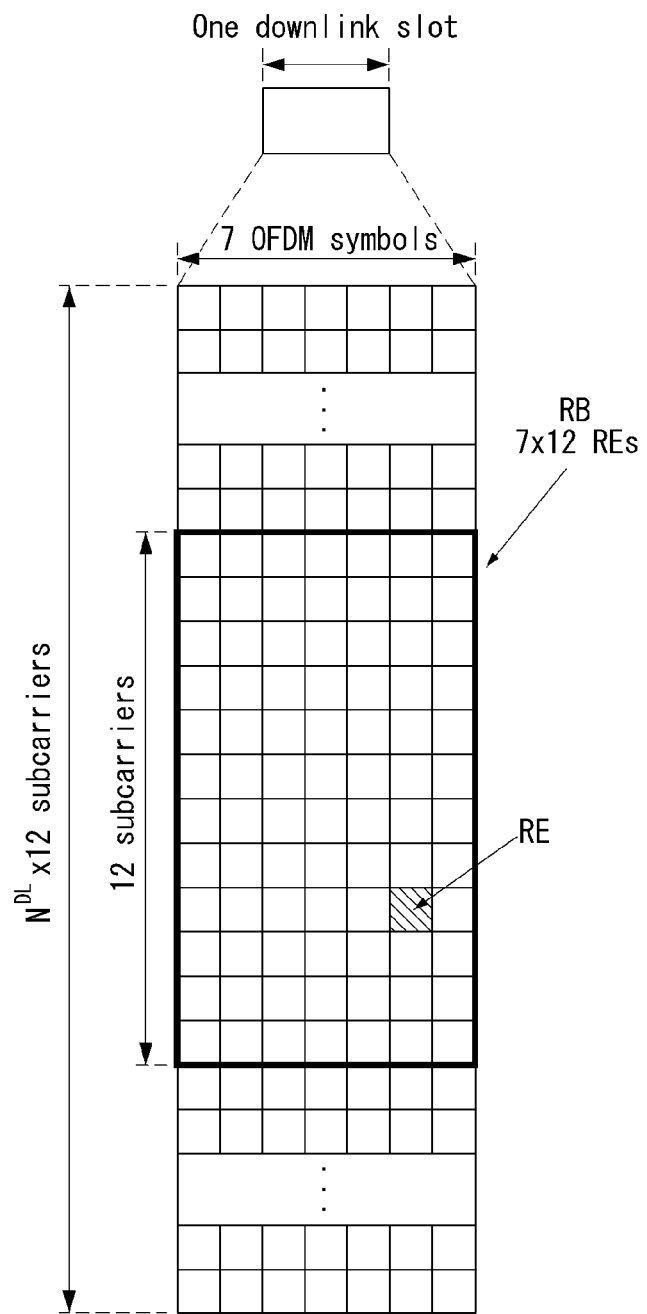
[FIG. 5]

[FIG. 6]
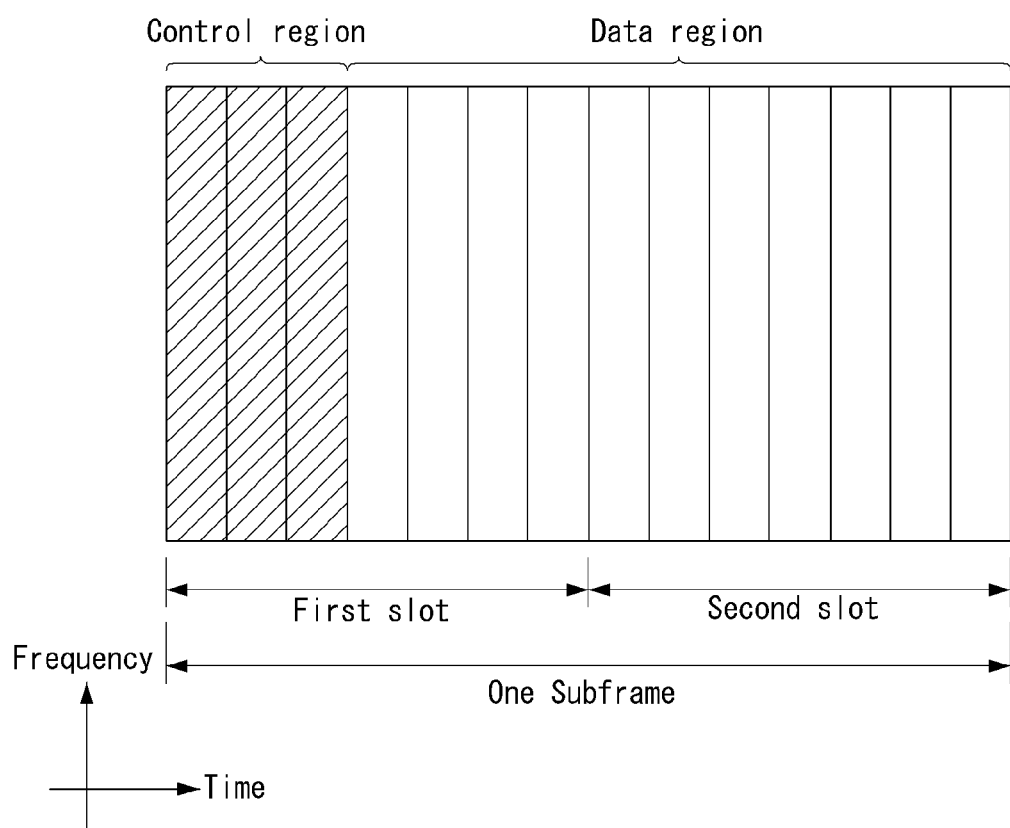

[FIG. 7]
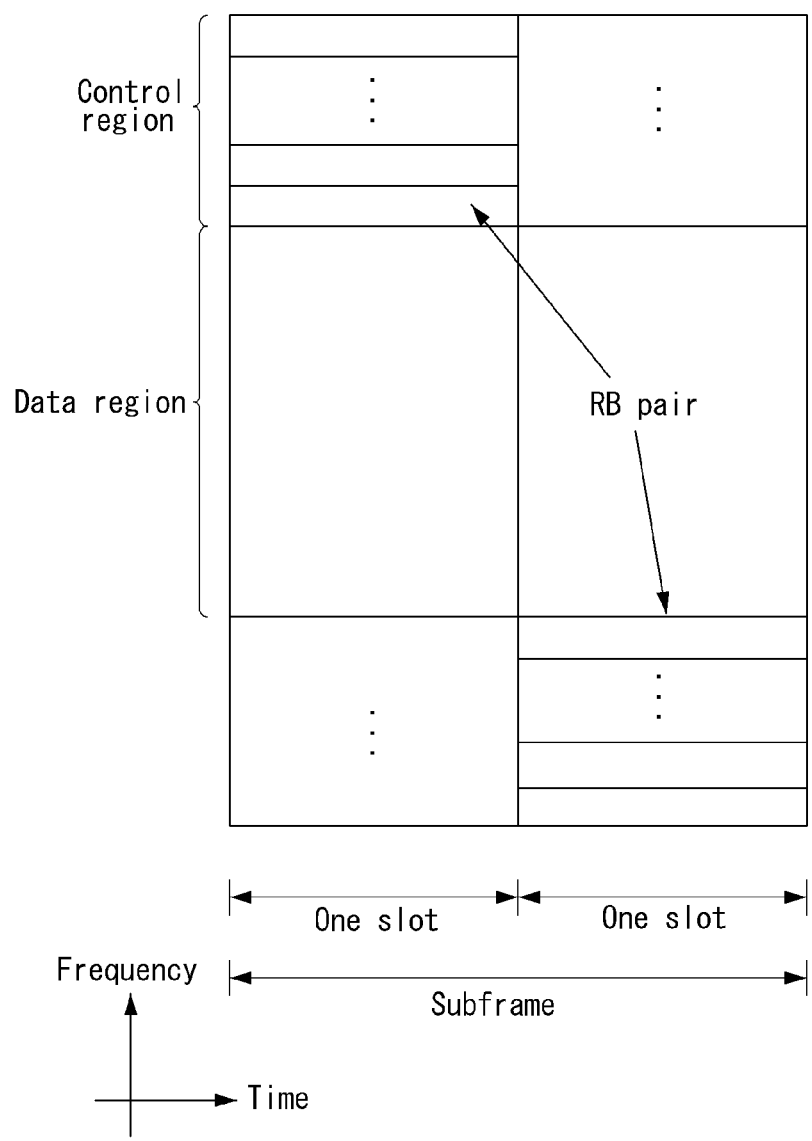

[FIG. 8]

| CIF (3) | 0/1A | FH | Resource block assignment | MCS/RV (5) | NDI | TPC(2) | DM RS CS(3) | DAI(2) | CQI req. | SRS | RAT |

【FIG. 9】
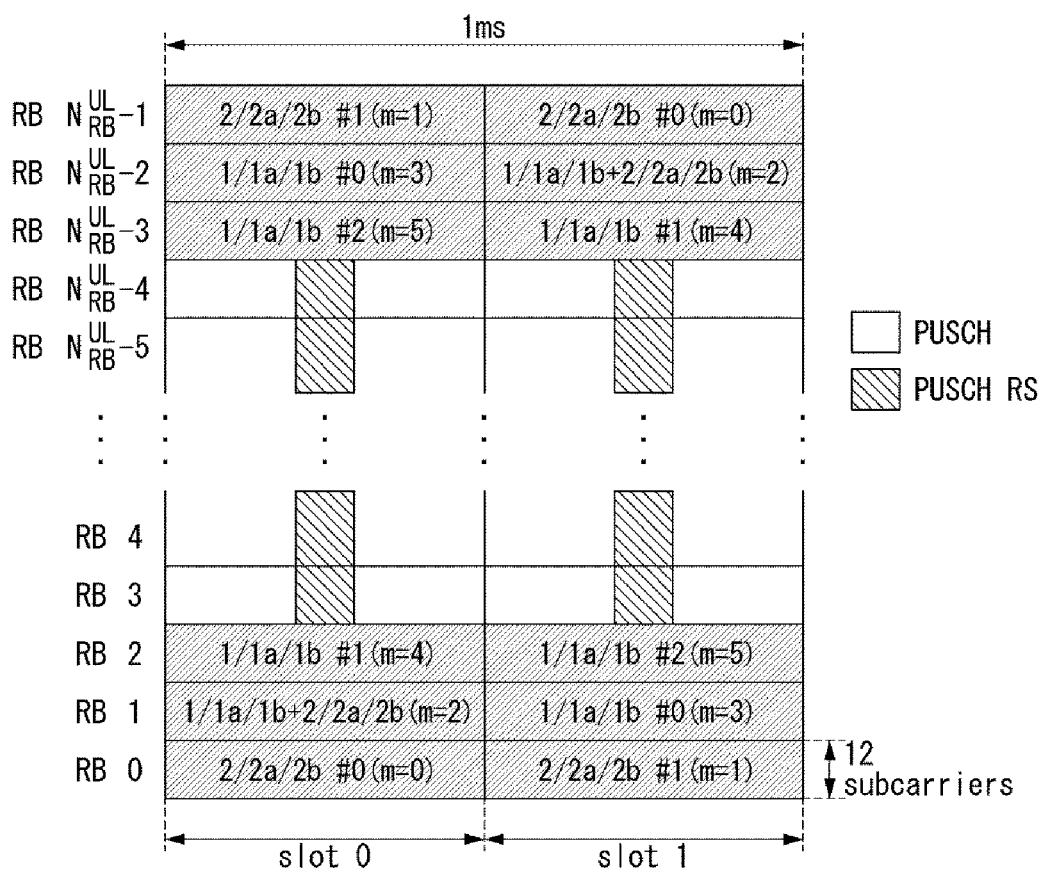

[FIG. 10]
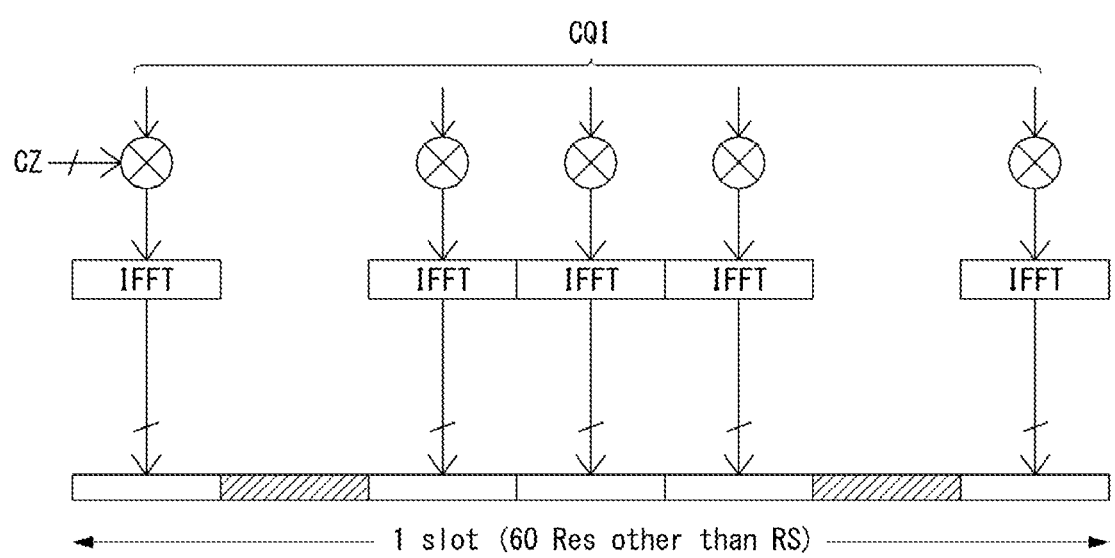

[FIG. 11]
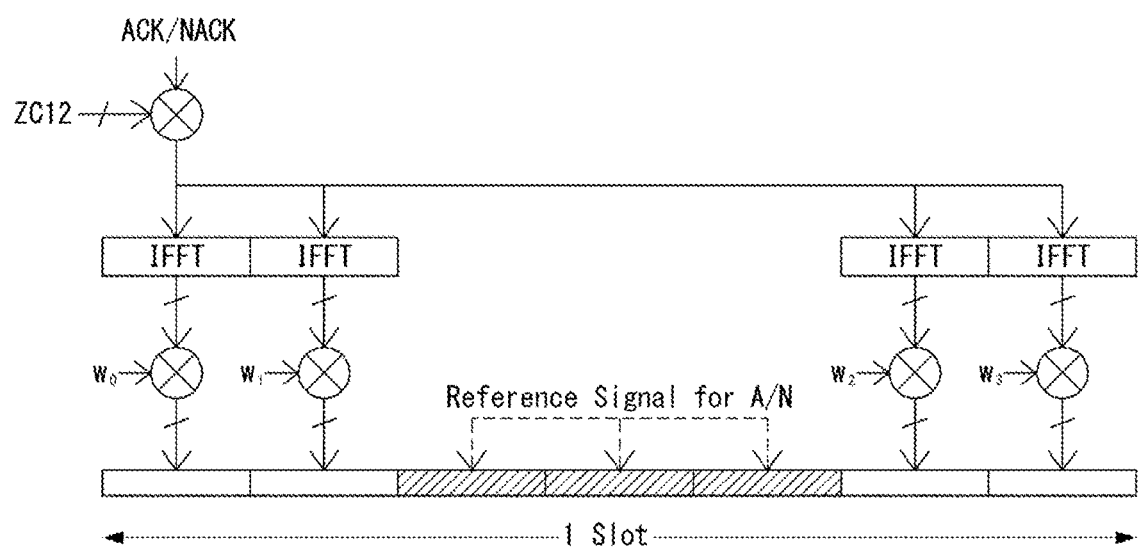

[FIG. 12]
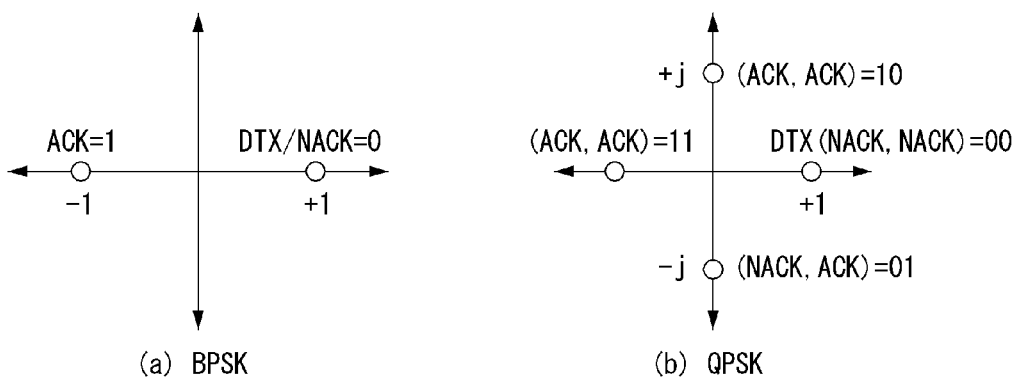

[FIG. 13]
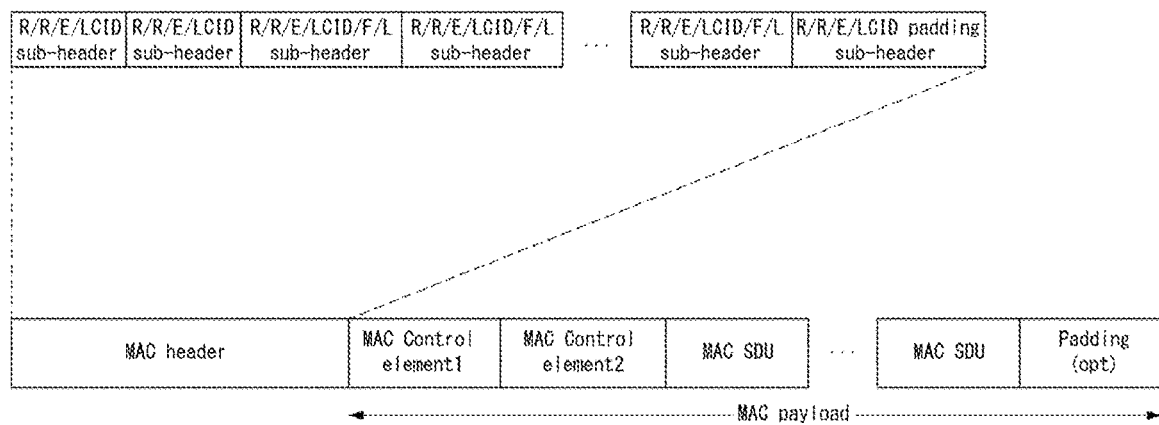

[FIG. 14]
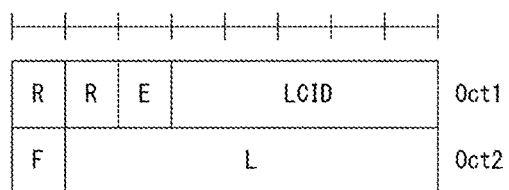
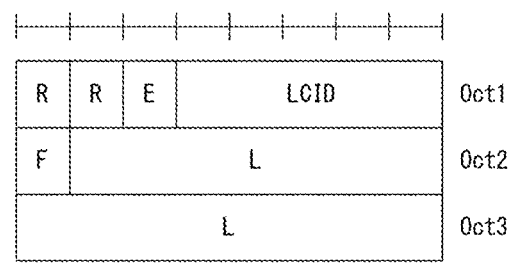
(a) R/R/E/LCID/F/L sub-header with 7-bit L field
(b) R/R/E/LCID/F/L sub-header with 15-bit L field

[FIG. 15]
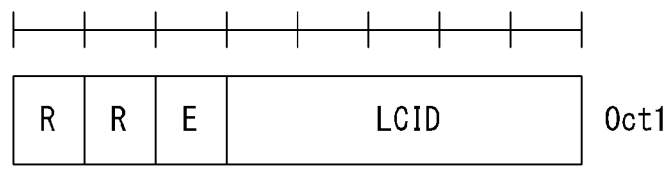
R/R/E/LCID sub-header
[FIG. 16]
(a) 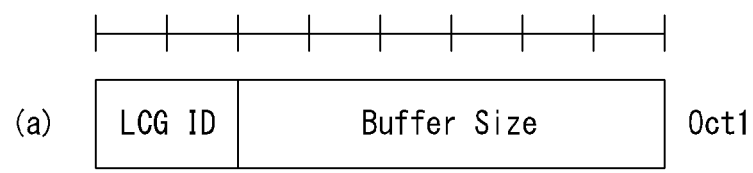
(b) 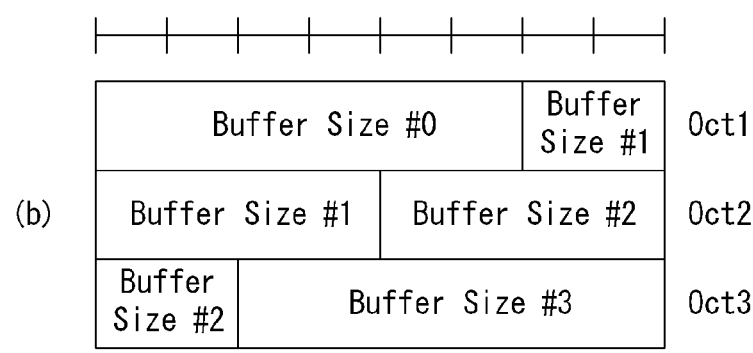

[FIG. 17]
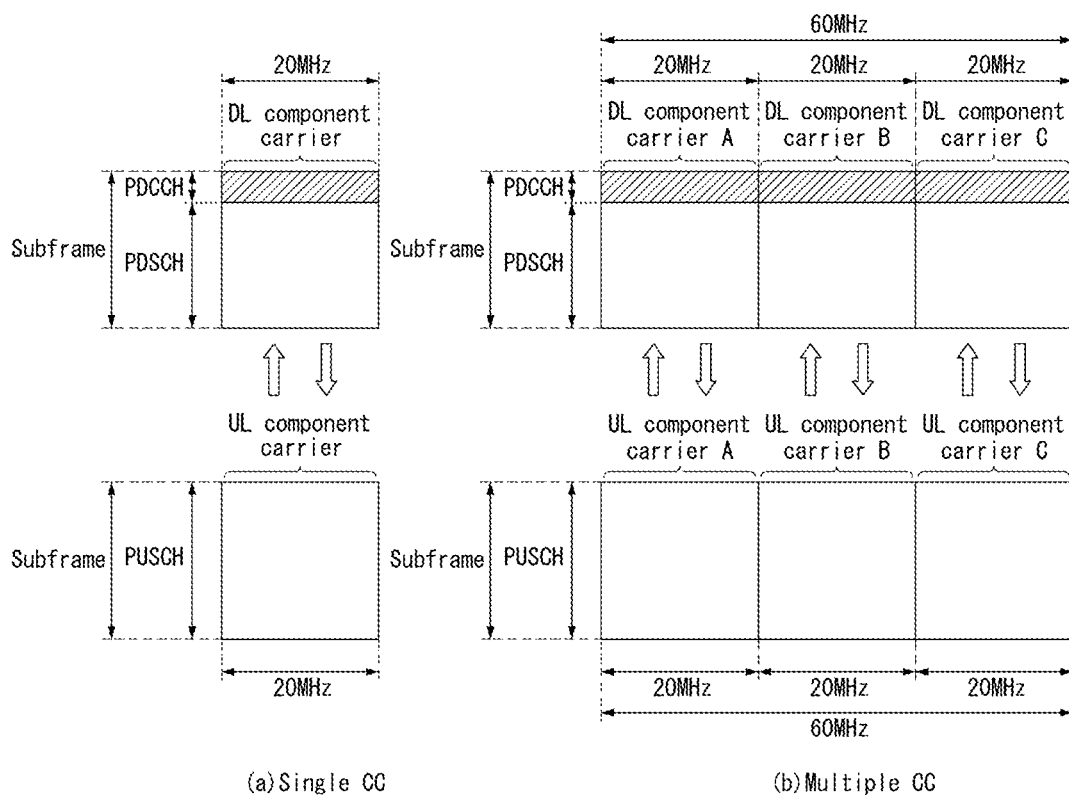
(a) Single CC
(b) Multiple CC

[FIG. 18]
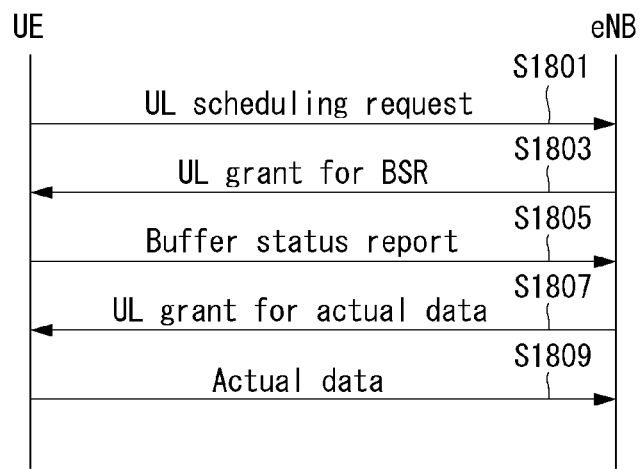
(a)
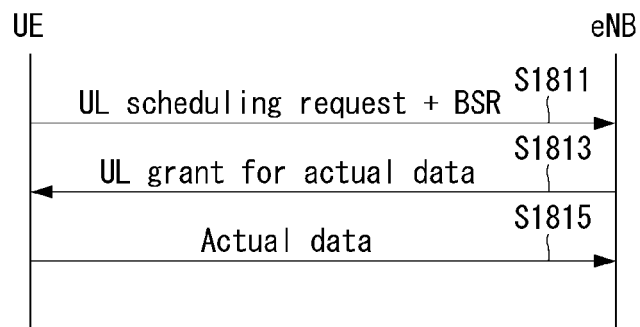
(b)

【FIG. 19】
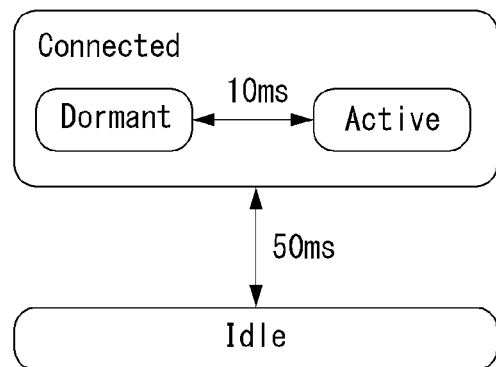
【FIG. 20】
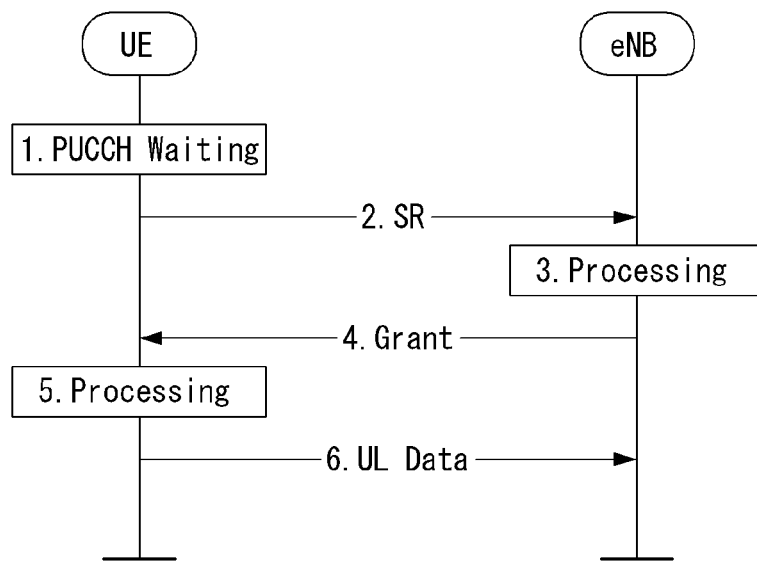

[FIG. 21]
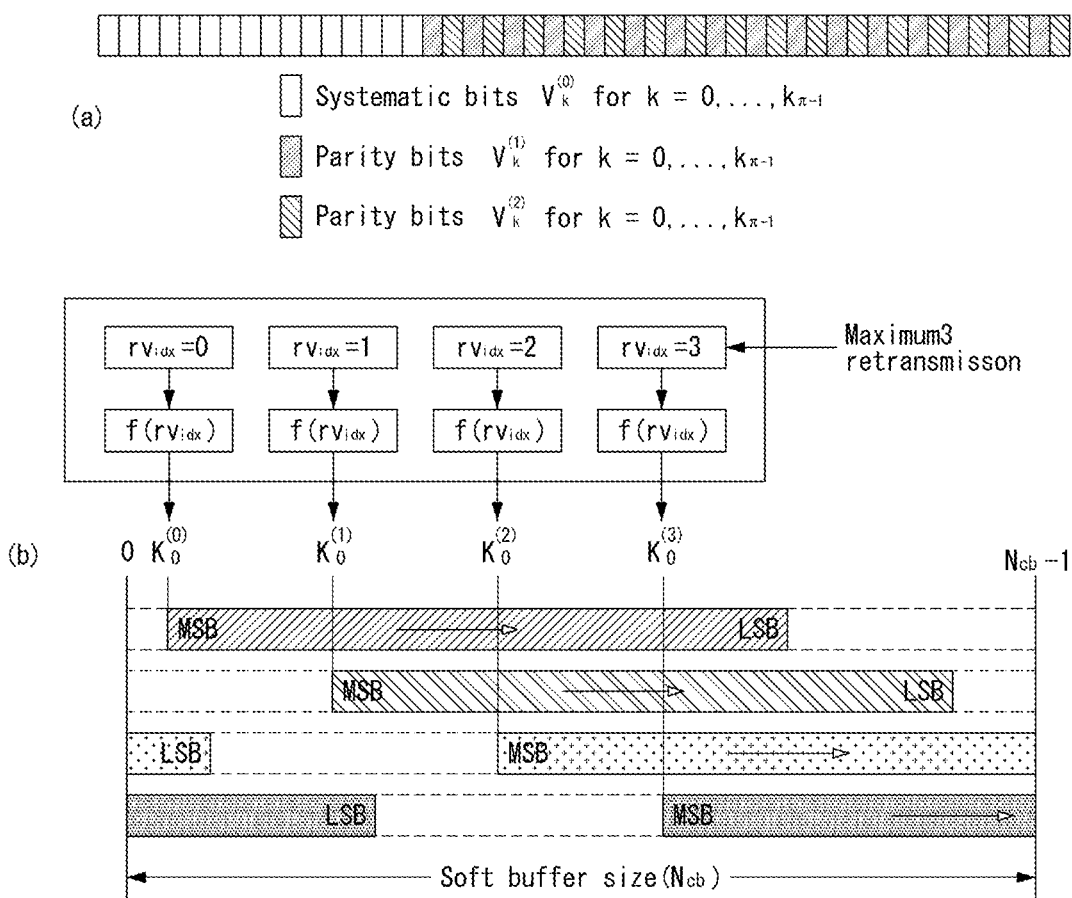

[FIG. 22]
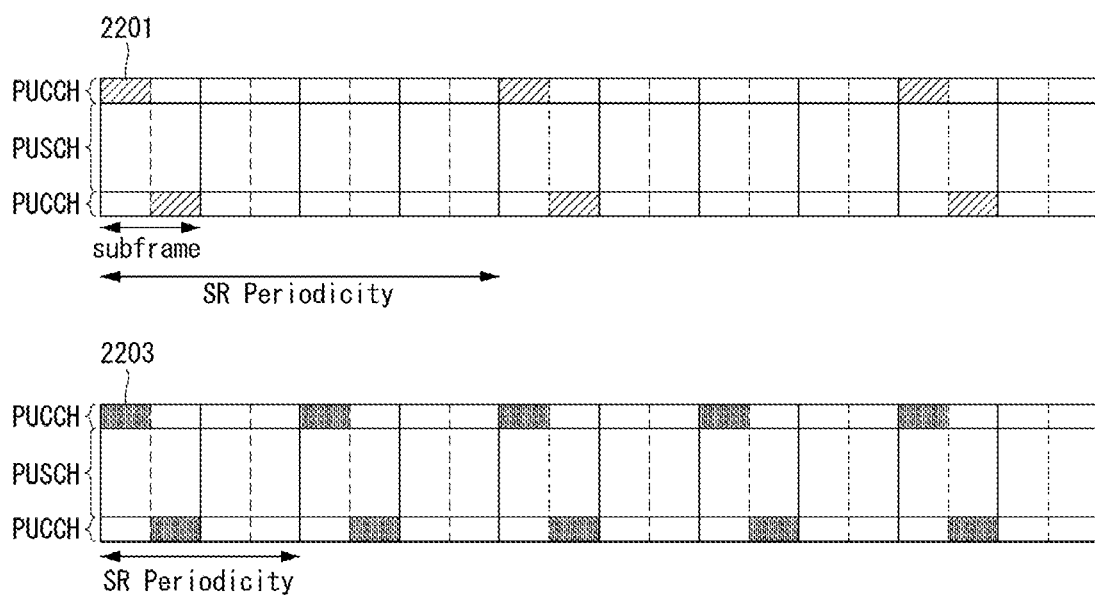

【FIG. 23】
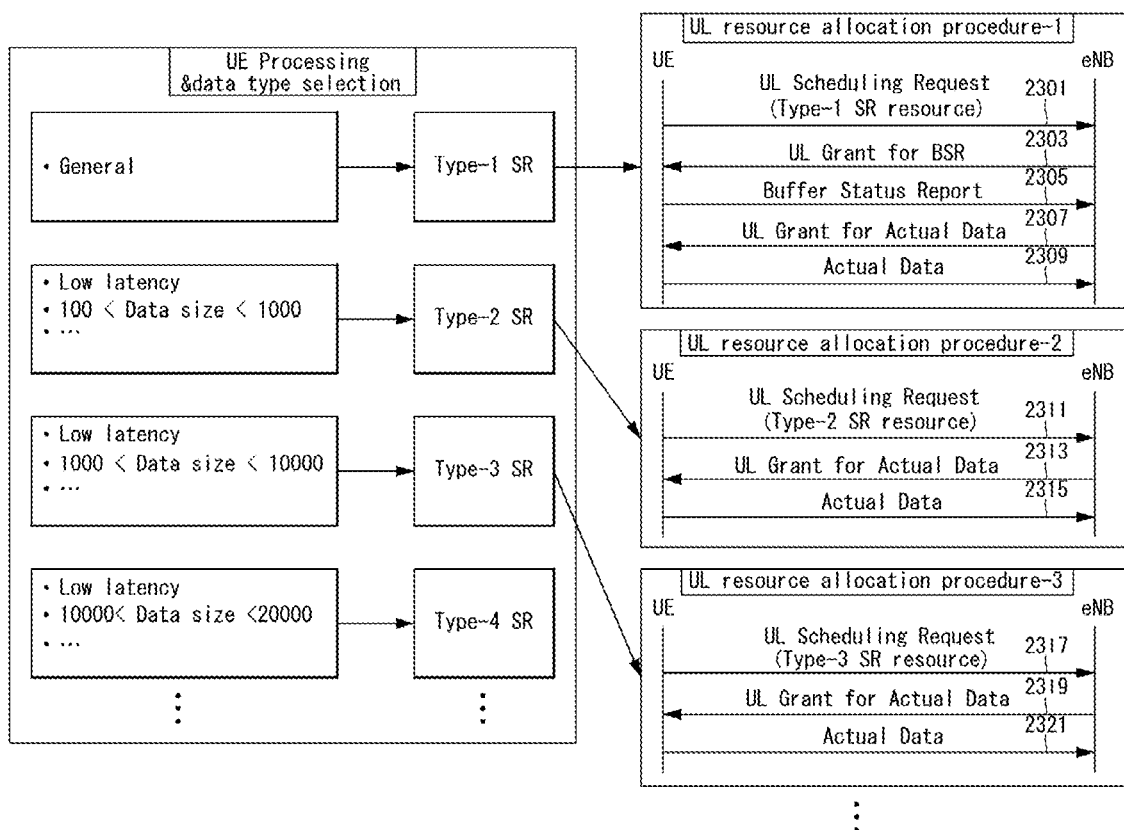

[FIG. 24]
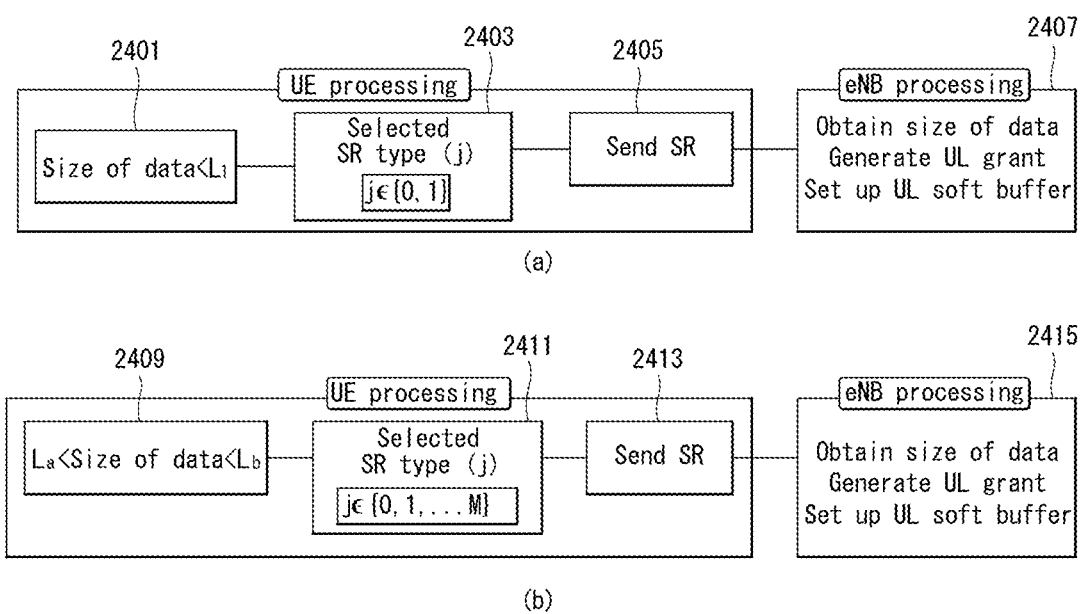

[FIG. 25]
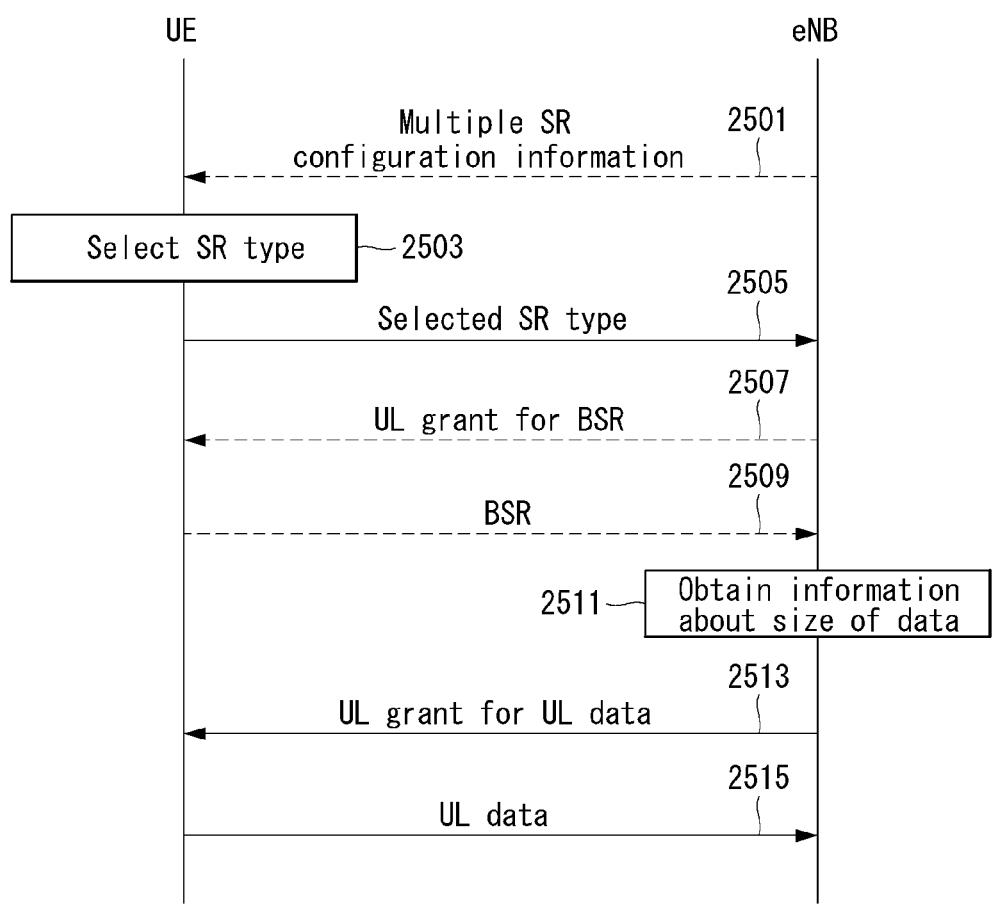

[FIG. 26]
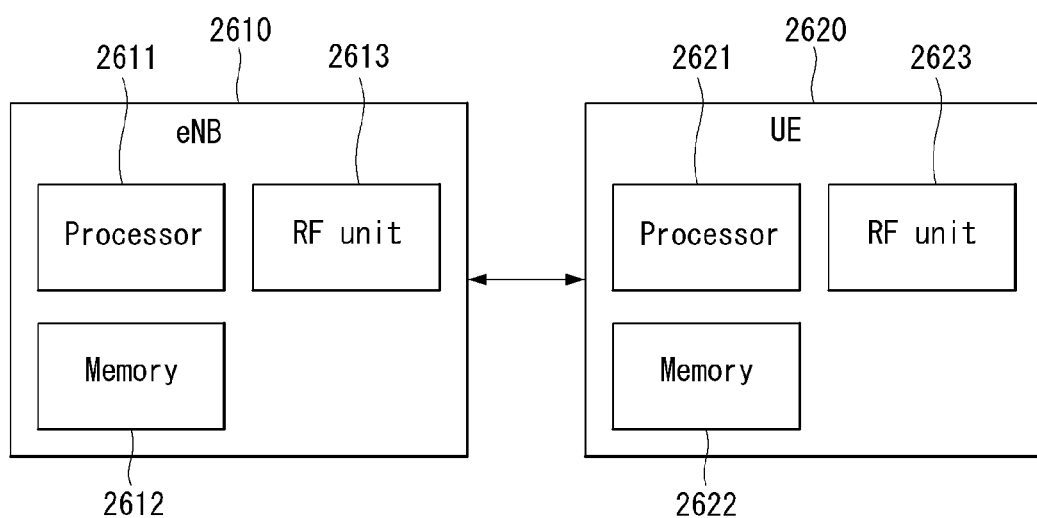

METHOD AND APPARATUS FOR REQUESTING SCHEDULING IN WIRELESS COMMUNICATION SYSTEM

CROSS-REFERENCE TO RELATED APPLICATIONS

This application is a continuation of U.S. patent application Ser. No. 15/326,994, filed Jan. 17, 2017, now U.S. Pat. No. 10,178,691, which is the National Stage filing under 35 U.S.C. 371 of International Application No. PCT/KR2015/002280, filed on Mar. 10, 2015, which claims the benefit of U.S. Provisional Application No. 62/026,009, filed on Jul. 17, 2014, the contents of which are all hereby incorporated by reference herein in their entirety.

TECHNICAL FIELD

The present invention relates to a wireless communication system and, more particularly, to a method for requesting, by User Equipment (UE), scheduling from a Base Station (BS) in order to send uplink (UL) data to the eNB and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

In mobile communication systems, in order to maximize resource utilization, a method of transmitting and receiving data through a resource allocation procedure based on base station scheduling. However, this causes to increase latency in uplink data transmission of a user equipment.

An object of the present invention is to propose the definition of multiple Scheduling Request (SR) types for minimizing the latency of UE in a wireless communication system.

Another object of the present invention is to propose a method for enabling UE to rapidly send UL data through a specific SR type if the UL data to be transmitted by the UE is generated from an application sensitive to delay or if the UE intermittently sends small data.

The technical problems solved by the present invention are not limited to the above technical problems and those skilled in the art may understand other technical problems from the following description.

Technical Solution

In an aspect of the present invention, a method of requesting, by user equipment (UE), scheduling for transmitting uplink data in a wireless communication system may include transmitting, by the UE, a Scheduling Request (SR) of an SR type selected from multiple SR types to an eNB, receiving, by the UE, an uplink grant determined according to the selected SR type from the eNB, and transmitting, by the UE, uplink data to the eNB through a physical uplink shared channel (PUSCH) resource allocated by the uplink grant.

In another aspect of the present invention, user equipment that requests scheduling for transmitting uplink data in a wireless communication system may include a Radio Frequency (RF) unit for sending and receiving radio signals and a processor. The processor may be configured to transmit a Scheduling Request (SR) of an SR type selected from multiple SR types to an eNB, receive an uplink grant determined according to the selected SR type from the eNB, and transmit uplink data to the eNB through a physical uplink shared channel (PUSCH) resource allocated by the uplink grant.

At least one of an index of a physical uplink control channel (PUCCH) resource, an SR periodicity, or an SR subframe offset for sending the SR may be differently configured according to each of the multiple SR types.

The size of the uplink data may be determined for each of the multiple SR types.

The PUSCH resource allocated by the uplink grant may be determined based on the size of the uplink data according to the selected SR type.

The size of a soft buffer set by the eNB may be determined based on the size of the uplink data according to the selected SR type.

A resource allocation procedure for sending the uplink data may be determined according to the multiple SR types.

The user equipment may receive multiple SR configuration information for configuring the multiple SR types from the eNB.

The multiple SR configuration information may include at least any one of information about an index of a PUCCH resource, an SR periodicity, or an SR subframe offset corresponding to each of the multiple SR types.

If the SR is an SR for sending the BSR, the user equipment may receive an uplink grant for sending a Buffer Status Report (BSR) from the eNB and send the BSR to the eNB through the PUSCH resource allocated by the uplink grant for sending the BSR.

Advantageous Effects

In accordance with an embodiment of the present invention, delay attributable to the assignment of UL resources can be reduced by newly defining multiple SR types.

Furthermore, in accordance with an embodiment of the present invention, UL data generated from an application sensitive to delay or intermittent UL data of a small size can be rapidly transmitted by newly defining a scheduling request signal.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 illustrates a schematic structure a network structure of an evolved universal mobile telecommunication system (E-UMTS) to which the present invention can be applied.

FIG. 2 illustrates the configurations of a control plane and a user plane of a radio interface protocol between the E-UTRAN and a UE in the wireless communication system to which the present invention can be applied.

FIG. 3 illustrates physical channels and a view showing physical channels used for in the 3GPP LTE/LTE-A system to which the present invention can be applied.

FIG. 4 is a diagram showing the structure of a radio frame used in a 3GPP LTE system to which the present invention can be applied.

FIG. 5 shows an example of a resource grid for one downlink slot in the wireless communication system to which the present invention can be applied.

FIG. 6 shows a structure of a downlink subframe in the wireless communication system to which the present invention can be applied.

FIG. 7 shows a structure of an uplink subframe in the wireless communication system to which the present invention can be applied.

FIG. 8 illustrates a structure of DCI format 0 in the wireless communication system to which the present invention can be applied.

FIG. 9 illustrates an example of a formation that PUCCH formats are mapped to the PUCCH regions of the UL physical resource blocks in the wireless communication system to which the present application can be applied.

FIG. 10 shows a structure of CQI channel in case of a normal CP in the wireless communication system to which the present invention can be applied.

FIG. 11 shows a structure of ACK/NACK in case of a normal CP in the wireless communication system to which the present invention can be applied.

FIG. 12 illustrates a method for multiplexing the ACK/NACK and the SR in the wireless communication system to which the present invention can be applied.

FIG. 13 illustrates the MAC PDU used in the MAC entity in the wireless communication system to which the present invention can be applied.

FIG. 14 and FIG. 15 illustrate the sub-header of the MAC PDU in the wireless communication system to which the present invention can be applied.

FIG. 16 illustrates formats of the MAC control elements in order to report the buffer state in the wireless communication system to which the present invention can be applied.

FIG. 17 represents an example of component carrier and carrier aggregation in the wireless communication system to which the present invention can be applied.

FIG. 18 illustrates a UL resource allocation procedure of a UE in the wireless communication system to which the present application can be applied.

FIG. 19 is a diagram for describing a latency in C-plane required in 3GPP LTE-A to which the present invention can be applied.

FIG. 20 is a diagram for describing a transition time from the dormant state to the active state for a synchronized UE required in 3GPP LTE-A to which the present invention can be applied.

FIG. 21 is a diagram for describing the soft buffer in the wireless communication system to which the present invention can be applied.

FIG. 22 is a diagram illustrating SR resources according to SR types in accordance with an embodiment of the present invention.

FIG. 23 is a diagram illustrating a method for requesting scheduling for transmitting UL data in accordance with an embodiment of the present invention.

FIG. 24 is a diagram illustrating a process of sending UL data using a multiple SR configuration in accordance with an embodiment of the present invention.

FIG. 25 is a diagram illustrating a method for requesting scheduling for transmitting UL data in accordance with an embodiment of the present invention.

FIG. 26 is a block diagram illustrating the configuration of a wireless communication apparatus in accordance with an embodiment of the present invention.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), preceding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, ..., $N_{RB}$×12−1) denotes an index of subcarrier in the frequency domain, and l (l=0, ..., 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of 01-DM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Hereinafter, the information transmitted through DCI format 0 will be described.

FIG. 8 illustrates a structure of DCI format 0 in the wireless communication system to which the present invention can be applied.

DCI format 0 is used for scheduling the PUSCH in one UL cell.

Table 2 represents information transmitted via DCI format 0.

TABLE 2

| Format 0 (Release 8) | Format 0 (Release 10) |
| --- | --- |
|  | Carrier Indicator (CIF) |
| Flag for format 0/format 1A differentiation | Flag for format 0/format 1A differentiation |
| Hopping flag (FH) | Hopping flag (FH) |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic shift for DM RS | Cyclic shift for DM RS |
| UL index (TDD only) | UL index (TDD only) |

TABLE 2-continued

| Format 0 (Release 8) | Format 0 (Release 10) |
| --- | --- |
| Downlink Assignment Index (DAI) | Downlink Assignment Index (DAI) |
| CSI request (1 bit) | CSI request (1 or 2 bits: 2 bit is for multi carrier) |
|  | SRS request |
|  | Resource allocation type (RAT) |

Referring to FIG. 8 and Table 2, the information transmitted via DCI format 0 is as follows.

1) Carrier indicator—Includes 0 or 3 bits.

2) Flag for DCI format 0/1A differentiation—Includes 1 bit, a value of 0 indicates DCI format 0 and a value of 1 indicates DCI format 1A.

3) Frequency hopping flag—Includes 1 bit. In this field, a most significant bit (MSB) of resource allocation may be used for multi-cluster allocation.

4) Resource block assignment and hopping resource assignment—Includes $\lceil \log_2(N_{RB}^{DL}(N_{RB}^{DL}+1)/2) \rceil$ bits.

Herein, in case of PUSCH hopping in single-cluster allocation, in order to acquire a value of $ñ_{PRB}(i)$ NUL_hop MSBs are used. $(\lceil \log_2(N_{RB}^{DL}(N_{RB}^{DL}+1)/2) \rceil - N_{UL\_hop})$ bits provide resource allocation of a first slot within an uplink subframe. In addition, if PUSCH hopping is not present in single-cluster allocation, $(\lceil \log_2(N_{RB}^{DL}(N_{RB}^{DL}+1)/2) \rceil)$ bits provide resource allocation within an uplink subframe. In addition, if PUSCH hopping is not present in multi-cluster allocation, resource allocation information is obtained from concatenation between the frequency hopping flag field and resource block assignment and hopping resource assignment field and $$\left\lceil \log_2\left( \binom{\lceil N_{RB}^{UL}/P+1 \rceil}{4} \right) \right\rceil$$

bits provide resource allocation within an uplink subframe. At this time, the P value is determined by the number of downlink resource blocks.

5) Modulation and coding scheme (MCS)—Includes 5 bits.

6) New data indicator—Includes 1 bit.

7) Transmit power control (TPC) command for PUSCH—Includes 2 bits.

8) Index of orthogonal cover/orthogonal cover code (OC/OCC) and cyclic shift for demodulation reference signal (DMRS)—Includes 3 bits.

9) Uplink Index—Includes 2 bits. This field is present only in TDD operation according to uplink-downlink configuration 0.

10) Downlink assignment index (DAI)—Includes 2 bits. This field is present only in TDD operation according to uplink-downlink configurations 1 to 6.

11) Channel state information (CSI) request—Includes 1 or 2 bits. Herein, a 2-bit field is only applied to the case in which the DCI is mapped to the UE, for which one or more downlink cells are configured, by the C-RNTI in a UE-specific manner.

12) Sounding reference signal (SRS) request—Includes 0 or 1 bit. This field is present only in the case in which a scheduled PUSCH is mapped in a UE-specific manner by the C-RNTI.

13) Multi-cluster flag—Includes 1 bit.

If the number of information bits in DCI format 0 is less than the payload size (including added padding bits) of DCI format 1A, 0 is appended to DCI format 0 such that the number of information bits becomes equal to the payload size of DCI format 1A.

PUCCH (Physical Uplink Control Channel)

The PUCCH carries various sorts of uplink control information (UCI) according to format as follows.

SR (Scheduling Request): This is information used for requesting the UL-SCH resource. This information is transmitted using an on-off keying (OOK) method.

HARQ ACK/NACK: This is a response signal for DL data packet on a PDSCH. This information represents whether the DL data packet is successfully received. One bit of ACK/NACK is transmitted in response to a single DL codeword and two bits of ACK/NACK are transmitted in response to two DL codewords.

CSI (Channel State Information): This is feedback information for a DL channel. The CSI may include at least one of a channel quality indicator (CQI), a rank indicator (RI), a precoding matrix indicator (PMI) and a precoding type indicator (PTI). Hereinafter, this will be referred to 'CQI' as a common term for the convenience of description.

The PUCCH may be modulated by using a binary phase shift keying (BPSK) technique and a quadrature phase shift keying (QPSK) technique. Control information for a plurality of UEs may be transmitted through the PDCCH. In case of performing code division multiplexing (CDM) to distinguish signal of each of the UEs, constant amplitude zero autocorrelation (CAZAC) sequence is mostly used. Since the CAZAC sequence has characteristics of maintaining a fixed amplitude in a time domain and a frequency domain, the CAZAC has characteristics proper to increase coverage by lowering a peak-to-average power ratio (PAPR) or a cubic metric (CM) of a UE. In addition, the ACK/NACK information for DL data transmission transmitted through the PDCCH is covered by using an orthogonal sequence or an orthogonal cover (OC).

Additionally, control information transmitted on the PUCCH may be distinguished by using a cyclically shifted sequence that has different cyclic shift (CS) values. The cyclically shifted sequence may be generated by shifting cyclically a base sequence by as much as a predetermined cyclic shift amount. The cyclic shift amount is indicated by a CS index. The number of available cyclic shift may be changed according to delay spread of a channel. Various sorts of sequence may be used as the basic sequence, and the CAZAC sequence described above is an example.

In addition, the quantity of control information that can be transmitted by a UE in a subframe may be determined depending on the number of SC-FDMA symbols (i.e., signifies SC-FDMA symbols other than SC-FDMA symbols used for reference signal (RS) transmission for detecting coherent detection of the PUCCH, but except for the last SC-FDMA symbol in a subframe in which a sounding reference signal (SRS) is configured).

The PUCCH may be defined by seven sorts of different formats depending on the control information, a modulation technique, a quantity of the control information, etc. which is transmitted, and the property of uplink control information (UCI) transmitted according to each of the PUCCH formats may be summarized as Table 1 below.

TABLE 3

| PUCCH Format | Uplink Control Information(UCI) |
|---|---|
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

Referring to Table 3, PUCCH format 1 is used for a single transmission of a scheduling request (SR). Wave forms which are not modulated are applied to the single transmission of SR, and this will be described below in detail.

PUCCH format 1a or 1b is used for transmitting HARQ acknowledgement/non-acknowledgement (ACK/NACK). When the HARQ ACK/NACK is solely transmitted in an arbitrary subframe, PUCCH format 1a or 1b may be used. Or, the HARQ ACK/NACK and the SR may be transmitted in a same subframe by using PUCCH format 1a or 1b.

PUCCH format 2 is used for transmitting the CQI, and PUCCH format 2a or 2b is used for transmitting the CQI and the HARQ ACK/NACK. In case of an extended CP, PUCCH format 2 may also be used for transmitting the CQI and the HARQ ACK/NACK.

PUCCH format 3 is used for carrying an encoded UCI of 48 bits. PUCCH format 3 may carry the HARQ ACK/NACK for a plurality of serving cells, the SR (if existed) and the CSI report for a serving cell.

FIG. 9 illustrates an example of a formation that PUCCH formats are mapped to the PUCCH regions of the UL physical resource blocks in the wireless communication system to which the present application can be applied.

A PUCCH for a UE is allocated to an RB pair in a subframe. The RBs belonging to the RB pair occupy different subcarriers in each of a first slot and a second slot. A frequency occupied by RBs belonged in the RB pair allocated to the PUCCH is changed based on a slot boundary. This is expressed that the RB pair allocated to the PUCCH is frequency-hopped in the slot boundary. A UE transmits UL control information through different subcarriers according to time, thereby obtaining a frequency diversity gain.

In FIG. 9, $N_{RB}^{UL}$ represents the number of resource block in UL, and $0, 1, \ldots, N_{RB}^{UL}-1$ signifies given number of the physical resource block. Basically, the PUCCH is mapped to both edges of the UL frequency blocks. As shown in FIG. 9, PUCCH formats 2/2a/2b are mapped to the respective PUCCH regions marked by m=0 and 1, and this may be represented as PUCCH formats 2/2a/2b are mapped to the resource blocks located at band edges. In addition, PUCCH formats 2/2a/2b and PUCCH formats 1/1a/1b are mixedly mapped to the PUCCH region marked by m=2. Next, PUCCH formats 1/1a/1b may be mapped to the PUCCH regions marked by m=3, 4 and 5. The number $N_{RB}^{(2)}$ of PUCCH RBs usable by PUCCH formats 2/2a/2b may be indicated by the UEs within a cell by broadcasting signaling.

Table 4 represents modulation schemes according to the PUCCH format and number of bits per subframe. In Table 4, PUCCH formats 2a and 2b correspond to the case of normal cyclic shift.

TABLE 4

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

Table 5 represents the number of symbols of PUCCH demodulation reference signal per slot according to the PUCCH format.

TABLE 5

| PUCCH format | Normal cyclic prefix | Extended cyclic prefix |
|---|---|---|
| 1, 1a, 1b | 3 | 2 |
| 2, 3 | 2 | 1 |
| 2a, 2b | 2 | N/A |

Table 6 represents SC-FDMA symbol location of the PUCCH demodulation reference signal according to the PUCH format. In Table 6, l represents a symbol index.

TABLE 6

| | Set of values for l | |
|---|---|---|
| PUCCH format | Normal cyclic prefix | Extended cyclic prefix |
| 1, 1a, 1b | 2, 3, 4 | 2, 3 |
| 2, 3 | 1, 5 | 3 |
| 2a, 2b | 1, 5 | N/A |

Hereinafter, PUCCH formats 2/2a/2b will be described.

PUCCH formats 2/2a/2b are used for CQI feedback (or ACK/NACK transmission together with the CQI feedback) for DL transmission. In order for the CQI to be transmitted with the ACK/NACK may be transmitted with being embedded in the CQI RS (in case of a normal CP), or transmitted with the CQI and the ACK/NACK being joint coded (in case of an extended CP).

FIG. 10 shows a structure of CQI channel in case of a normal CP in the wireless communication system to which the present invention can be applied.

Among SC-FDMA symbols 0 to 6 in a slot, SC-FDMA symbols 1 to 5 (a second and a sixth symbols) are used for transmitting demodulation reference signal (DMRS), and the CQI information may be transmitted in the remainder SC-FDMA symbols. Meanwhile, in case of the extended CP, one SC-FDMA symbol (SC-FDMA symbol 3) is used for transmitting the DMRS.

In PUCCH formats 2/2a/2b, the modulation by the CAZAC sequence is supported, and the QPSK modulated symbol is multiplied by the CAZAC sequence of length 12. The cyclic shift (CS) of sequence may be changed between symbols and slots. An orthogonal covering is used for the DMRS.

In two SC-FDMA symbols which are three SC-FDMA symbol intervals from seven SC-FDMA symbols included in a slot, the reference signal (DMRS) is carried, and in the remainder five SC-FDMA symbols, the CQI information is carried. In order to support a high speed UE, two RSs are used in a slot. In addition, the respective UEs are distinguished by using the cyclic shift (CS) sequence. The CQI information symbols are transmitted with being modulated to whole SC-FDMA symbol, and the SC-FDMA symbol includes one sequence. That is, the UE transmits the CQI with being modulated to each sequence.

The number of symbols which may be transmitted to one TTI is 10, and the modulation of the CQI information is also defined to the QPSK. Front five symbols are transmitted in a first slot, and the remainder five symbols are transmitted in a second slot. Since the CQI value of 2 bits may be carried in case of using the QPSK mapping for the SC-FDMA symbol, the CQI value of 10 bits may be carried in one slot. Accordingly, the CQI value of maximum 20 bits may be carried in one subframe. In order to spread the CQI information in a frequency domain, a frequency domain spread code is used.

As the frequency domain spread code, the CAZAC sequence of length 12 (e.g., ZC sequence) may be used. Each control channel may be distinguished by applying the CAZAC sequence that has different cyclic shift values. An inverse fast Fourier transform is performed for the CQI information which is spread in the frequency domain.

By the cyclic shifts that have twelve equivalent intervals, twelve different UEs may be orthogonally multiplexed on the same PUCCH RB. In case of a normal CP, the DMRS sequence on SC-FDMA symbol 1 and 5 (on SC-FDMA symbol 3 in case of an extended CP) is similar to the CQI signal sequence on the frequency domain, but the modulation similar to that of the CQI information is not applied.

A UE may be semi-statically configured to report different CQI, PMI and RI types periodically on the PUCCH resources indicated by the PUCCH resource indexes $n_{PUCCH}^{(1,\tilde{p})}$, $n_{PUCCH}^{(2,\tilde{p})}$, $n_{PUCCH}^{(3,\tilde{p})}$ by a higher layer signaling. Herein, the PUCCH resource index $n_{PUCCH}^{(2,\tilde{p})}$ is information that indicates the PUCCH region used for transmitting PUCCH formats 2/2a/2b and cyclic shift (CS) to be used.

Table 7 represents an orthogonal sequence (OC) $[\overline{w}^{(\tilde{p})}(0) \ldots \overline{w}^{(\tilde{p})}(N_{RS}^{PUCCH}-1)]$ for RS in PUCCH formats 2/2a/2b/3.

TABLE 7

| Normal cyclic prefix | Extended cyclic prefix |
|---|---|
| [1 1] | [1] |

Next, PUCCH formats 1/1a/1b will be described below.

FIG. 11 shows a structure of ACK/NACK in case of a normal CP in the wireless communication system to which the present invention can be applied.

A confirmation response information (in a state of not scrambled) of 1 bit or 2 bits may be represented as a HARQ ACK/NACK modulation symbol using the BPSK and QPSK modulation techniques, respectively. An affirmative confirmation response (ACK) may be encoded as '1', and a negative confirmation response (NACK) may be encoded as '0'.

When transmitting a control signal in an allocated bandwidth, two dimensional spread is applied in order to increase a multiplexing capacity. That is, a spread in frequency domain and a spread in time domain are simultaneously applied in order to increase the number of UE or the number of control channel that can be multiplexed.

In order to spread an ACK/NACK signal in frequency domain, a frequency domain sequence is used as a basic sequence. As the frequency domain sequence, Zadoff-Chu (ZC) sequence which is one of constant amplitude zero autocorrelation waveform sequences may be used.

That is, in PUCCH format 1a/1b, the symbol modulated using the BPSK or the QPSK modulation scheme is multiplied by the CAZAC sequence (e.g., the ZC sequence) of length 12. For example, the result of the CAZAC sequence r(n) (n=0, 1, 2, . . . , N−1) of length N modulated to modulation symbol d(0) is y(0), y(1), y(2), . . . , y(N−1). The symbols y(0), y(1), y(2), . . . , y(N−1) may be referred to as block of symbols.

Like this, different cyclic shifts (CS) are applied to the Zadoff Chu (ZC) sequence which is a basic sequence, and multiplexing of different UEs or different control channels may be applied. The number of CS resources supported by SC-FDMA symbol which is for PUCCH RBs in the HARQ ACK/NACK transmission is setup by a cell-specific higher layer signaling parameter ($\Delta_{shift}^{PUCCH}$).

After multiplying the CAZAC sequence to the modulation symbol, the block-wise spread using an orthogonal sequence is applied. That is, the ACK/NACK signal spread in a frequency domain is spread in a time domain by using an orthogonal spreading code. As for the orthogonal spreading code (or the orthogonal cover sequence or an orthogonal cover code (OCC)), a Walsh-Hadamard sequence or a Discrete Fourier Transform (DFT) sequence may be used. For example, the ACK/NACK signal may be spread by using the orthogonal sequence (w0, w1, w2, w3) of length 4 for four symbols. In addition, an RS is also spread through the orthogonal sequence of length 3 or length 2. This is referred to as an orthogonal covering (OC).

As for the CDM of ACK/NACK information or demodulation reference signal, an orthogonal covering such as a Walsh code, a DFT matrix, etc. may be used.

The DFT matrix is comprised of square matrixes, and constructed as a size of N×N (N is a natural number).

The DFT matrix may be defined as Equation 1.

$$W = \left(\frac{\omega^{jk}}{\sqrt{N}}\right)_{j,k=0,\ldots,N-1} \quad \text{[Equation 1]}$$

Also, the DFT matrix may be represented as a matrix of Equation 2 below which is equivalent to Equation 1.

$$W = \frac{1}{\sqrt{N}}\begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \cdots & \omega^{(N-1)(N-1)} \end{bmatrix} \quad \text{[Equation 2]}$$

In Equation 2, $$\omega = e^{-\frac{2\pi i}{N}}$$

signifies a primitive Nth root of unity.

The DFT matrix of 2 points, 4 points and 8 points correspond to Equations 3, 4 and 5 below.

$$\frac{1}{\sqrt{2}}\begin{bmatrix} 1 & 1 \\ 1 & -1 \end{bmatrix} \quad \text{[Equation 3]}$$

$$W = \frac{1}{\sqrt{4}}\begin{bmatrix} 1 & 1 & 1 & 1 \\ 1 & -i & -1 & i \\ 1 & -1 & 1 & -1 \\ 1 & i & -1 & -i \end{bmatrix} \quad \text{[Equation 4]}$$

$$W = \frac{1}{\sqrt{8}}\begin{bmatrix} \omega^0 & \omega^0 & \omega^0 & \cdots & \omega^0 \\ \omega^0 & \omega^1 & \omega^2 & \cdots & \omega^7 \\ \omega^0 & \omega^2 & \omega^4 & \cdots & \omega^{14} \\ \omega^0 & \omega^3 & \omega^6 & \cdots & \omega^{21} \\ \omega^0 & \omega^4 & \omega^8 & \cdots & \omega^{28} \\ \omega^0 & \omega^5 & \omega^{10} & \cdots & \omega^{35} \\ \vdots & \vdots & \vdots & \ddots & \vdots \\ \omega^0 & \omega^7 & \omega^{14} & \cdots & \omega^{49} \end{bmatrix} \quad \text{[Equation 5]}$$

In case of a normal CP, in SC-FDMA symbols that are series of 3 middle parts out of 7 SC-FDMA symbols included in a slot, the reference signal (RS) is carried, and in the rest 4 SC-FDMA symbols, the ACK/NACK signal is carried. Meanwhile, in case of an extended CP, the RS may be carried in two consecutive symbols of the middle parts. The number and location of symbols used for the RS may be changed according to a control channel, and the number and location of symbols used for the ACK/NACK signal related may be changed according to the control channel as well.

For normal ACK/NACK information, the Walsh-Hadamard sequence having length 4 is used, and for shortened ACK/NACK information and the reference signal, a DFT of length 3 is used.

For the reference signal of an extended CP case, the Walsh-Hadamard sequence having length 2 is used.

Table 8 represents an orthogonal sequence of length 4 $[w(0) \ldots w(N_{SF}^{PUCCH}-1)]$ for PUCCH format 1a/1b.

TABLE 8

| Sequence index $n_{oc}^{(\tilde{p})}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

Table 9 represents an orthogonal sequence of length 3 $[w(0) \ldots w(N_{SF}^{PUCCH}-1)]$ for PUCCH format 1a/1b.

TABLE 9

| Sequence index $n_{oc}^{(\tilde{p})}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 10 represents an orthogonal sequence $[\overline{w}^{(\tilde{p})}(0) \ldots \overline{w}^{(\tilde{p})}(N_{RS}^{PUCCH}-1)]$ for the RS in PUCCH format 1/1a/1b.

| Sequence index $\overline{n}_{oc}^{(\tilde{p})}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

As described above, by using the CS resource in the frequency domain and the OC resource in the time domain, numerous UEs may be multiplexed in a code division multiplexing (CDM) method. That is, the ACK/NACK information and the RS of a great number of UEs may be multiplexed on the same PUCCH RB.

For the time domain spreading CDM like this, the number of extended codes that are supported for the ACK/NACK information is limited by the number of RS symbols. That is, since the number of SC-FDMA symbols in the RS transmission is less than the number of SC-FDMA symbols in the ACK/NACK information transmission, the multiplexing capacity of RS is smaller than the multiplexing capacity of ACK/NACK information.

For example, in case of a normal CP, the ACK/NACK information may be transmitted in four symbols. In case of an extended CP, three orthogonal spreading codes, not four, may be used. This is because the number of RS transmission symbols is limited to three, and three orthogonal spreading codes only may be used for the RS.

In case that three symbols in one slot are used for the RS transmission and four symbols are used for the ACK/NACK information transmission in the subframe of a normal CP, for example, if six cyclic shifts (CSs) can be used in the frequency domain and three orthogonal covering (OC) resources can be used in the time domain, the HARQ confirmation response from total 18 different UEs may be multiplexed in one PUCCH RB. If two symbols in one slot of a subframe of the extended CP are used for the RS transmission and four symbols are used for the ACK/NACK information transmission, for example, if six cyclic shifts (CSs) can be used in the frequency domain and two orthogonal covering (OC) resources can be used in the time domain, the HARQ confirmation response from total 12 different UEs may be multiplexed in the PUCCH RB.

Subsequently, PUCCH format 1 will be described. The schedule request (SR) is transmitted in a way of a UE being requested to be scheduled or a way of not being requested. The SR channel reuses the ACK/NACK channel structure in PUCCH format 1a/1b, and is configured in on-off keying (OOK) method based on an ACK/NACK channel design. In the SR, the reference signal is not transmitted. Accordingly, in the normal CP, the sequence of length 7 is used, and in the extended CP, the sequence of length 6 is used. For the SR and the ACK/NACK, different cyclic shifts or orthogonal covers may be allocated.

FIG. 12 illustrates a method for multiplexing the ACK/NACK and the SR in the wireless communication system to which the present invention can be applied.

The structure of SR PUCCH format 1 is identical to the structure of ACK/NACK PUCCH format 1a/1b illustrated in FIG. 12.

The SR is transmitted by using the on-off keying (KOO) method. Particularly, the UE transmits the SR having a modulation symbol d(0)=1 to request the PUSCH resource (a positive SR), and in case of not requesting the scheduling (a negative SR), nothing is transmitted. As the PUCCH structure for the ACK/NACK is reused for the SR, different PUCCH resource index (that is, a combination of different CS and orthogonal code) within a same PUCCH region may be allocated to the SR (PUCCH format 1) or to the HARQ ACK/NACK (PUCCH format 1a/1b). The PUCCH resource index that is going to be used by the UE for the SR transmission may be set by the UE-specific higher layer signaling.

In case that the UE is required to transmit the positive SR in the subframe in which the CQI transmission is scheduled, CQI is dropped and the SR only may be transmitted. Similarly, if a case is occurred that the SR and the SRS should be transmitted at the same time, the UE drops the CQI rather may transmit the SR only.

In case that the SR and the ACK/NACK are occurred in the same subframe, the UE transmits the ACK/NACK on the SR PUCCH resource that is allocated for the positive SR. In the meantime, in case of the negative SR, the UE transmits the ACK/NACK on the allocated ACK/NACK resource.

FIG. 12 illustrates a property mapping for the simultaneous transmission of the ACK/NACK and the SR. In particular, it illustrates that the NACK (or, in case of 2 MIMO codewords, NACK, NACK) is modulated to map to +1. Accordingly, it is processed as NACK when a discontinuous transmission (DTX) is occurred.

For the SR and persistent scheduling, the ACK/NACK resource consisting of a CS, an OC, and a physical resource block (PRB) may be allocated to the UE through the radio resource control (RRC). Meanwhile, for the dynamic ACK/NACK transmission and non-persistent scheduling, the ACK/NACK resource may be allocated to the UE implicitly through the lowest CCE index of the PDCCH corresponding to the PDSCH.

In case of requiring resources for the UL data transmission, the UE may transmit the SR. That is, the SR transmission is triggered by an event.

The SR PUCCH resource is configured by a higher layer signaling except a case that the SR is transmitted with the HARQ ACK/NACK by using PUCCH format 3. That is, it is configured by a SchedulingRequestConfig information element that is transmitted through the radio resource control (RRC) message (for example, RRC connection reconfiguration message).

Table 11 exemplifies the SchedulingRequestConfig information element.

TABLE 11

```
-- ASN1START
SchedulingRequestConfig ::=        CHOICE {
    release                            NULL,
    setup                              SEQUENCE {
        sr-PUCCH-ResourceIndex             INTEGER (0..2047),
        sr-ConfigIndex                     INTEGER (0..157),
        dsr-TransMax                       ENUMERATED {
                                               n4, n8, n16, n32, n64, spare3, spare2,
spare1}
    }
}
SchedulingRequestConfig-v1020 ::=   SEQUENCE {
    sr-PUCCH-ResourceIndexP1-r10       INTEGER (0..2047)    OPTIONAL
}
-- ASN1STOP
```

Table 12 represents a field that is included in the SchedulingRequestConfig information element.

TABLE 12

SchedulingRequestConfig field descriptions dsr-TransMax
Parameter for the SR transmission. Value n4 represents 4 transmissions, value n8 represents 8 transmissions, and the rest is the same as above.
sr-ConfigIndex
Parameter($I_{SR}$). Values 156 and 157 are not applied to release 8.
sr-PUCCH-ResourceIndex, sr-PUCCH-ResourceIndexP1
Parameter($n_{PUCCH,\ SRI}^{(1,\ p)}$) for the respective antenna port P0 and P1. E-UTRAN is configured the sr-PUCCH-ResourceIndexP1 only in case that the sr-PUCCHResourceIndex is set.

Referring to Table 12, the UE receives sr-PUCCH-ResourceIndex parameter and sr-ConfigIndex parameter ($I_{SR}$) indicating the SR configuration index through the RRC message for the SR transmission. By the sr-ConfigIndex parameter, $SR_{PERIODICITY}$ indicating the periodicity when the SR is transmitted and $N_{OFFSET,SR}$ indicating the subframe where the SR is transmitted may be configured. That is, the SR is transmitted from a specific subframe that is periodically repeated according to $I_{SR}$ that is given by a higher layer. Also, the subframe resource and CDM/frequency division multiplexing (FDM) resource may be allocated to the resource for the SR.

Table 13 represents the SR transmission periodicity according to the SR configuring index and the SR subframe offset.

TABLE 13

| SR configuration Index $I_{SR}$ | SR periodicity (ms) $SR_{PERIODICITY}$ | SR subframe offset $N_{OFFSET,SR}$ |
| --- | --- | --- |
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

Buffer Status Reporting (BSR)

FIG. 13 illustrates the MAC PDU used in the MAC entity in the wireless communication system to which the present invention can be applied.

Referring to FIG. 13, the MAC PDU includes a MAC header, at least one MAC service data unit (SDU) and at least one control element, additionally may include a padding. In some cases, at least one of the MAC SDUs and the MAC control elements may not be included in the MAC PDU.

As an example of FIG. 13, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 13, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 13, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 13, the sub-header that is included four header fields may be used. In case that the sub-header includes four fields like this, the four fields may be R/R/E/LCID.

FIG. 14 and FIG. 15 illustrate the sub-header of the MAC PDU in the wireless communication system to which the present invention can be applied.

Each field is described as below with reference to FIG. 14 and FIG. 15.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 14 represents the value of LCID for the DL-SCH

TABLE 14

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 15 represents the value of LCID for the UL-SCH

TABLE 15

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 14 and Table 15 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 14 (a)), otherwise, the 15-bit L field may be used (FIG. 14 (b)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 15.

FIG. 16 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 16 (a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 16 (b), may include four buffer size fields indicating the buffer state of four groups having 0 to 3 LCG IDs. Each of the buffer size fields may be used for identifying the total amount of available data from different logical channel groups.

Carrier Aggregation

A communication environment considered in the embodiments of the present invention includes all multi-carrier environments. That is, a multi-carrier system or a carrier aggregation (CA) system used in the present invention refers to a system for aggregating and utilizing one or more component carriers having a bandwidth smaller than a target bandwidth, for wideband support.

In the present invention, multi-carrier refers to carrier aggregation. Carrier aggregation includes aggregation of contiguous carriers and aggregation of non-contiguous carriers. In addition, the number of component carriers aggregated in downlink and uplink may be differently set. The case where the number and/or bandwidth of downlink component carriers (DL CCs) and the number and bandwidth of uplink component carriers (UL CCs) are the same is referred to as symmetric aggregation and the case where the number and/or bandwidth of downlink component carriers (DL CCs) and the number and bandwidth of uplink component carriers (UL CCs) are different is asymmetric aggregation. Such carrier aggregation is used interchangeable with the terms "carrier aggregation", "bandwidth aggregation" or "spectrum aggregation".

Carrier aggregation configured by aggregating two or more CCs aims at support a bandwidth of up to 100 MHz in an LTE-A system. When one or more carriers having a bandwidth smaller than a target bandwidth are aggregated, the bandwidth of the aggregated carriers may be restricted to a bandwidth used in the existing system, for backward compatibility with the existing IMT system. For example, the existing 3GPP LTE system may support bandwidths of 1.4, 3, 5, 10, 15 and 20 MHz and an LTE_Advanced (LTE_A) system evolved from the LTE system may support a bandwidth greater than 20 MHz using only the bandwidths supported by the LTE system. Alternatively, the carrier aggregation system used in the present invention may define a new bandwidth so as to support CA, regardless of the bandwidths used in the existing system.

The above-described carrier aggregation environment may be called a multiple-cell environment. The cell is defined as a combination of downlink resources (DL CCs) and uplink resources (UL CCs), and the uplink resources are not mandatory. Accordingly, the cell may be composed of downlink resources alone or both downlink resources and uplink resources. If a specific UE has one configured serving cell, the UE may have one DL CC and one UL CC. If a specific UE has two or more configured serving cells, the UE may have DL CCs corresponding in number to the number of cells and the number of UL CCs may be equal to or less than the number of DL CCs, and vice versa. If a specific UE has a plurality of configured service cells, a carrier aggregation environment in which the number of DL CCs is greater than the number of UL CCs may also be supported. That is, carrier aggregation may be regarded as aggregation of two or more cells having different carrier frequencies (center frequencies of a cell). If carrier aggregation is supported, linkage between a carrier frequency (or a DL CC) of downlink resources and a carrier frequency (or a UL CC) of uplink resources may be indicated by system information. The DL CC and the UL CC may be referred to as DL cell and UL cell, respectively. The cell described herein should be distinguished from a "cell" as a general region covered by a BS. A cell used in the LTE-A system includes a primary cell (PCell) and a secondary cell (SCell). The PCell and the SCell may be used as service cells. In case of a UE which is in an RRC_connected state but does not set carrier aggregation or supports carrier aggregation, only one serving cell composed of a PCell exists. In contrast, in case of a UE which is in an RRC_CONNECTED state and sets carrier aggregation, one or more serving cells exist. The serving cell includes a PCell and one or more SCell.

A serving cell (PCell and SCell) may be set through an RRC parameter. PhyCellId is a physical layer identifier of a cell and has an integer value from 0 to 503. SCellIndex is a short identifier used to identify an SCell and has an integer value from 1 to 7. A value of 0 is applied to the PCell and SCellIndex is previously given to be applied to the Scell. That is, a cell having a smallest cell ID (or a cell index) in ServCellIndex becomes the PCell.

The PCell refers to a cell operating on a primary frequency (e.g., a primary CC (PCC)). The PCell is used to perform an initial connection establishment process or a connection re-establishment process at a UE. The PCell may indicate a cell indicated in a handover process. The PCell refers to a cell for performing control-associated communication among serving cells set in a carrier aggregation environment. That is, a UE may receive a PUCCH allocated by a PCell to which the UE belongs and perform transmission and use only the PCell to acquire system information and change a monitoring procedure. In evolved universal terrestrial radio access (E-UTRAN), a UE supporting a carrier aggregation environment may change only the PCell for a handover procedure using an RRCConnectionReconfiguration message of a higher layer including mobilityControlInfo.

The SCell refers to a cell operating on a secondary frequency (e.g., a secondary CC (SCC)). Only one PCell may be allocated to a specific UE and one or more SCells may be allocated to the specific UE. The SCell may be configured after radio resource control (RRC) connection establishment and may be used to provide additional radio resources. A PUCCH is not present in cells except for the PCell among serving cells set in a carrier aggregation environment, that is, the SCells. E-UTRAN may provide all system information associated with the operation of an associated cell in an RRC_CONNECTED state via a dedicated signal when SCells are added to a UE supporting a carrier aggregation environment. Change of system information may be controlled by release and addition of the SCell. At this time, an RRCConnectionReconfiguration message of a higher layer may be used. The E-UTRAN may transmit a dedicated signal having a different parameter to each UE, rather than broadcasting a signal in the associated SCell.

After an initial security activation process begins, an E-UTRAN may configure a network by adding one or more SCells to a PCell initially configured in a connection establishment process. In a carrier aggregation environment, the PCell and the SCell may operate as respective CCs. In the following embodiments, a primary CC (PCC) may be used as the same meaning as the PCell and a secondary CC (SCC) may be used as the meaning as the SCell.

FIG. 17 represents an example of component carrier and carrier aggregation in the wireless communication system to which the present invention can be applied.

FIG. 17 (a) represents a single carrier structure that is used in a LTE system. There are DL CC and UL CC in component carrier. One component carrier may have 20 MHz frequency range.

FIG. 17 (b) represents a carrier aggregation structure that is used in a LTE-A system. FIG. 17 (b) represents a case that three component carriers having 20 MHz frequency are aggregated. There are three DL CCs and UL CCs respectively, but the number of DL CCs and UL CCs are not limited thereto. In case of the carrier aggregation, the UE enables to monitor three CCs at the same time, to receive the DL signal/data, and to transmit the UL signal/data.

If, N DL CCs are managed in a specific cell, the network may allocate M (M≤N) DL CCs. In this case, the UE may monitor the limited M DL CCs only and receive the DL signal. Also, the network may give a priority to L (L≤M≤N) DL CCs and have the prioritized DL CCs allocated to the UE, in this case, the UE should monitor the DL CCs without fail. This way may be applied for the UL transmission.

The linkage between the DL resource carrier frequency (or DL CC) and the UL resource carrier frequency (or UL CC) may be instructed by a higher layer message like RRC message or system information. For example, the combination of DL resource and UL resource may be configured by the linkage that is defined by system information block type 2 (SIB2). Particularly, the linkage may signify the mapping relationship between the DL CC through which the PDCCH carrying a UL grant is transmitted and the UL CC that uses the UL grant, or signify the mapping relationship between the DL CC (or UL CC) through which the data for HARQ is transmitted and the UL CC (or DL CC) through which the HARQ ACK/NACK signal is transmitted.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 18 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 18(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 18(a), the case that the PUSCH resource for transmitting the BSR is not allocated to a UE is illustrated, and the UE transmits the scheduling request (SR) to an eNB first in order to be allocated with the PUSCH resources (step, S1801).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1803), the UE transmits the triggered BSR through the PUSCH resources which are allocated by the UL grant (step, S1805).

The eNB verifies the quality of data that the UE actually transmit to the UL through the BSR, and transmits the UL grant for the PUSCH resources for actual data transmission to the UE (step, S1807). The UE that receives the UL grant for actual data transmission transmits the actual UL data to the eNB through the PUSCH resources (step, S1809).

FIG. 18(b) exemplifies the UL resource allocation procedure for actual data in case that the UL radio resources for the BSR are allocated to a UE.

Referring to FIG. 18(b), the case that the PUSCH resources for BRS transmission are already allocated to a UE is illustrated. In the case, the UE transmits the BSR through the allocated PUSCH resources, and transmits a scheduling request to an eNB (step, S1811). Subsequently, the eNB verifies the quality of data to be transmitted to the UL by the UE through the BSR, and transmits the UL grant for the PUSCH resources for actual data transmission to the UE (step, S1813). The UE that receives the UL grant for actual data transmission transmits the actual UL data to the eNB through the allocated PUSCH resources (step, S1815).

FIG. 19 is a diagram for describing a latency in C-plane required in 3GPP LTE-A to which the present invention can be applied.

Referring to FIG. 19, 3GPP LTE-A requests a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Uplink initiated transition, synchronized
Uplink initiated transition, unsynchronized
Downlink initiated transition, synchronized
Downlink initiated transition, unsynchronized FIG. 20 is a diagram for describing a transition time from the dormant state to the active state for a synchronized UE required in 3GPP LTE-A to which the present invention can be applied.

In FIG. 20, the UL resource allocation procedure of 3 steps (in case of UL radio resources for the BSR are allocated) described in FIG. 18 above is illustrated. In LTE-A system, the latency is required for UL resource allocation as represented in Table 11 below.

Table 16 represents a transition time from the dormant state to the active state initiated by a UL transmission, in case of a synchronized UE which is required in LTE-A system.

TABLE 16

| Component | Description | Time [ms] |
|---|---|---|
| 1 | Average delay to next SR opportunity (1 ms/5 ms PUCCH cycle) | 0.5/2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
| | Total delay | 9.5/11.5 |

Referring to FIG. 20 and Table 16, as an average delay due to a RACH scheduling section that has a RACH cycle of 1 ms/5 ms, 0.5 ms/2.5 ms is required, and 1 ms is required for a UE to transmit the SR. And 3 ms is required for an eNB to decode the SR and generate the scheduling grant, and 1 ms is required to transmit the scheduling grant. And 3 ms is required for a UE to decode the scheduling grant and encode the UL data in L2 layer, and 1 ms is required to transmit the UL data.

As such, total 9.5/15.5 ms are required for a UE to complete a procedure of transmitting the UL data.

Accordingly, due to system characteristics of transmitting data based on scheduling by an eNB, the problem of increasing the latency even in case of transmitting UL data of a UE.

Particularly, in case of an intermittent application (e.g., a health care, a traffic safety, etc.) or an application in which fast transmission is required, such a data transmission method is not proper since it causes the latency inevitably.

Method for Requesting Scheduling Using a Multiple Scheduling Request Configuration In order to perform a HARQ operation in a receiving end, it is required to store data that are still not successfully decoded yet, and the storage for this is referred to as a soft buffer. That is, the soft buffer signifies a space in which the soft value is stored in the receiving end before performing a channel decoding for the data transmitted from a transmission end. The soft buffer is controlled for each transmission block (TB) (or a HARQ process).

In LTE/LTE-A system, in case of DL, a memory size of the soft buffer within a UE is determined according to a UE category. The UE reports its category information and the like to a network, and determines a size of the soft buffer for each transmission block by considering a UE capacity.

When transmitting DL data, an eNB does not notify a size of DL data to the UE. Instead, the eNB notifies only the information such as rank information, number of stream, etc. For example, when the eNB transmits the DL data with four streams the UE logically divides the soft buffer into identical four sections, and stores them in the soft buffer for each stream.

On the other hand, in case of UL, an eNB configures the memory of soft buffer using the BSR information received from a UE. That is, the eNB is required to know the BSR information in order to configure a size of the soft buffer.

FIG. 21 is a diagram for describing the soft buffer in the wireless communication system to which the present invention can be applied.

LTE/LTE-A physical layers are interfaced using the MAC layer and the transport channel which are higher layers. In order to detect error within the transport block which is encoded in the receiving end, a cyclic redundancy check is attached to the transport block transmitted from the MAC layer, and the transport block is divided by a code block in order to be fit to a code block size defined in a turbo code.

An additional CRC is attached to each code block, and the code block is inputted in a turbo encoder and to which a turbo encoding whose coding rate is 1/3 is applied. The code block is outputted from the turbo encoder as systematic bits, first parity bits and second parity bits.

Each of the systematic bits, the first parity bits and the second parity bits are interleaved through a subblock interleaver. The interleaved bits are stored in a virtual circular buffer.

FIG. 21(a) illustrates a code block stored in the virtual circular buffer.

In FIG. 21, $v_k^{(0)}$ (k=0, ..., $K_\pi$-1) represents interleaved systematic bits sequence, each of $v_k^{(1)}$ (k=0, ..., $K_\pi$-1) and $v_k^{(2)}$ (k=0, ..., $K_\pi$-1) represent interleaved parity bit sequences.

As shown in FIG. 21(a), the systematic bits are firstly stored in the virtual cyclic buffer, and the first parity bits and the second parity bits are alternately stored by one by one bit. The length of virtual cyclic buffer equals to $K_w=3K_\pi$.

Since a receiving side (i.e., an eNB that receives UL or a UE that receives DL) is required to store the data not successfully decoded yet in order to perform the HARQ process, for this, the receiving side should setup a soft buffer.

In case of the DL-SCH and the PCH transmission channel, a size $N_{cb}$ of the soft buffer for each code block is determined as Equation 6 below.

$$N_{cb} = \min\left(\left\lfloor \frac{N_{IR}}{C} \right\rfloor, K_w\right) \quad \text{[Equation 6]}$$

In Equation 6, C represents the number of code blocks. $N_{IR}$ represents the size of soft buffer for transmission block.

The soft buffer size $N_{IR}$ for transmission block is defined as Equation 7 below.

$$N_{IR} = \left\lfloor \frac{N_{soft}}{K_C \cdot K_{MIMO} \cdot \min(M_{DL\_HARQ}, M_{limit})} \right\rfloor \quad \text{[Equation 7]}$$

In Equation 7, floor(x) is a function that represents the biggest integer among integers that are the same or smaller than x, and min(x, y) is a function that represents a smaller value between x and y. $N_{soft}$ is a total number of soft channel bits. $N_{soft}$ is determined according to UE category. $K_{MIMO}$ is a value determined according to use of spatial multiplex. $M_{limit}$ is a constant value, and is 8.

On the other hand, in case of the UL-SCH and the MCH transmission channel, a size $N_{cb}$ of soft buffer for each code block is determined as Equation 8 below.

$$N_{cb} = K_w \quad \text{[Equation 8]}$$

In case of UL of Equation 8, an eNB configures the soft buffer in three fold size of UL data based on the BSR for each UE. For example, when transmitting the BSR reporting that the data to be transmitted by the UE is 10000, the eNB configures the soft buffer size in a size of 30000 (=3*10000).

As such, in the eNB, the soft buffer is always configured as three fold size of UL data for each UE, and this is because a mother coding rate (turbo encoding and decoding) is 1/3.

FIG. 21(b) is a diagram for describing a soft combining in the soft buffer.

In UL/DL data transmission and reception, errors may occur in the data transmitted according to channel environment, etc. As a way of error correction, the ARQ method or more improved form of HARQ method may be used. According to the HARQ method, in case that the data received in a reception end are not properly decoded, NACK is feedback to transmission end.

The reception end (i.e., an eNB or a UE) stores previously received data (i.e., data not properly decoded) in a soft buffer during a predetermined time, and soft combines the data retransmitted from the transmission end with the data of the same transmission block stored in the soft buffer and decode it. If there is no data to soft combine, the reception end performs decoding with the received data only.

In 3GPP LTE/LTE-A, the HARQ of incremental redundancy (IR) type is used, and a redundancy version (RV) is changed for every retransmission. An initial position within a buffer for retransmission is defined by RV values ($rv_{idx}$=0, 1, 2 or 3).

As described above, in case of UL, an eNB configures a size of soft buffer (i.e., three fold of UL data reported in the BSR) based on the BSR information received from a UE.

Table 17 illustrates buffer size labels for the BSR.

TABLE 17

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

Referring to Table 17, a UE divides the UL data size by 64 levels, and transmits the information of the UL data size to an eNB using the BSR of 6 bits. For example, in case that the UL data size to be transmitted is 350 byte, the UE transmits index value 24 to the eNB using the BSR of 6 bits.

If the eNB does not know the BSR information, the eNB should configure the soft buffer size by assuming that the UL data size is the biggest data size. As such, in case of configuring the soft buffer size under the assumption of the biggest data size, there is a drawback of inducing a memory waste of the eNB.

Similarly, if the eNB configures a soft buffer with an arbitrary determination of the data size, consequently, a case may occur that the data is not written in the soft buffer (i.e., a case that the UL data is greater than the soft buffer size) since the eNB does not know which size of data is transmitted from a UE. Therefore, if the eNB arbitrarily configures the soft buffer as such, the channel decoding is available in the eNB, but there is a drawback that a data loss occurs in the UL data.

As such, according to the conventional method, in order for the UE to transmit the UL data to the eNB, it is required to transmit the BSR to the eNB, and the UE always follows 5-step the UL data transmission method (or the 3-step UL data transmission method in case that the UL resource is pre-allocated to the BSR; refer to FIG. 18) regardless of which application generates the UL data or the data size.

That is, the UE transmits the information of the UL data that is going to be sent by the UE itself to the eNB through the BSR, and the eNB allocates the UL resource to the corresponding UE based on the BSR information.

However, in case of performing the general 5-step UL resource allocation procedure (or the UL data transmission procedure), it is unavoidable of the latency to occur according to the UL data transmission. Particularly, in order to transmit the UL data that is intermittently generated within a predetermined size (in particular, small size) or the UL data that is generated by an application which is sensitive to delay, it is preferable to decrease the latency.

Accordingly, an embodiment of the present invention proposes a method for requesting scheduling using SRs classified into a plurality of types.

In accordance with an embodiment of the present invention, BSR information may be replaced with a multiple SR configuration (or a multiple SR type). That is, UE sends an SR to an eNB through different SR resources according to SR types. Furthermore, the eNB determines the SR types based on the received SR resources and allocates (assigns) uplink resources to corresponding UE based on the SR types.

In an embodiment of the present invention, in order to reduce delay generated when UL data that is intermittently generated and has a small size is transmitted, a data range, that is, the subject of a multiple SR configuration, may be configured to be only a specific range or the range of a specific size of data in the entire buffer size level. Furthermore, a data region matched with each SR type for each certain range within a set specific range can be determined.

For example, in the example of Table 17, only the index 0 to the index 11 in a buffer size level set as the entire 64 region may be set as the region of data, that is, the subject of a multiple SR configuration. Furthermore, three regions, for example, the index 0 to the index 3, the index 4 to the index 7, and the index 8 to the index 11 may be divided. Different SR types may be matched to the respective three regions and configured.

Furthermore, if the size of data is 10 bytes or less (i.e., the size of data≤10), it may be configured as an SR type 1. If the size of data is more than 10 bytes to 50 bytes or less (i.e., 10<the size of data≤50), it may be configured as an SR type 2. If the size of data is more than 50 bytes to less than 100 bytes (i.e., 50<the size of data≤100), it may be configured as an SR type 3.

Furthermore, the region of data, that is, the subject of a multiple SR configuration, may correspond to an existing entire buffer size level.

For example, as in the example of Table 17, the buffer size level set as the entire 64 region may be divided into a total of 8 regions for each 8 BSR index, and different SR types may be matched with the respective 8 regions and configured.

Such a configuration of the multiple SR types may be set in a UE-specific way or cell-specific way. That is, the range of the entire data region, that is, the subject of a multiple SR configuration, the range of each region (i.e., the range of data) divided within the entire data region, that is, the subject of the multiple SR configuration, and the number of regions may be determined in a cell-specific way or in a UE-specific way. Furthermore, the configuration of the multiple SR types may be dynamically changed or may be semi-statically changed.

For example, if multiple SR types are configured in a UE-specific way, multiple SR types respectively mapped to 4 regions, that is, the indices 0 to 3, the indices 4 to 7, the indices 8 to 11, and the indices 12 to 15, may be configured in UE 1. Multiple SR types respectively mapped to 3 regions, that is, the indices 0 to 4, the indices 5 to 9, and the indices 10 to 14, may be configured in UE 2.

Furthermore, in the UE 1, if the size of data is 10 bytes or less (i.e., the size of data≤10), it may be configured as an SR type 1. If the size of data is more than 10 bytes to 50 bytes or less (i.e., 10<the size of data≤50), it may be configured as an SR type 2. If the size of data is more than 50 bytes to 100 bytes or less (i.e., 50<the size of data≤100), it may be configured as an SR type 3. In the UE 2, if the size of data is 30 bytes or less, (i.e., the size of data≤30), it may be configured as an SR type 1. If the size of data is more than 30 bytes to 90 bytes or less (i.e., 30<the size of data≤90), it may be configured as an SR type 2.

In this case, the range of the aforementioned value (or index) is only for convenience of description, and the present invention is not limited thereto. That is, the range of the entire data in which multiple SR types are configured (or the range of BSR indices), the number of regions divided within the range of corresponding data (i.e., the number of multiple SR types), and the range of data mapped to each SR type (or the range of a BSR index) may be set in various ways.

If the multiple SR types are configured as described above, UE may selectively use the SR types based on the size of UL data to be transmitted. That is, the UE may request resource allocation (assignment) for the UL data from an eNB using the type of UL data to be transmitted or an SR type mapped to the size of the UL data.

A method for sending multiple SR type configuration information is described below.

First, new information elements may be newly defined as the multiple SR configuration information.

That is, information for configuring the multiple SR types may be defined through a multiple SR configuration by omitting information about the transmission of a BSR for each UE or for each logical channel ID of UE and additionally using the size of UL data corresponding to a specific BSR.

Furthermore, in current LTE/LTE-A, UE transmits (sends) BSR information having a length of 6 bits to an eNB through a single SR configuration using RRC. As described above, an embodiment of the present invention may include a scheduling request procedure for sending BSR information of 6 bits in length within the multiple SR configuration.

Table 18 illustrates information elements for configuring the multiple SR types.

TABLE 18

```
-- ASN1START
SchedulingRequestConfig ::=     CHOICE {
     release                    NULL,
     setup                      SEQUENCE {
         sr0-PUCCH-ResourceIndex        INTEGER (0..2047),
         sr0-ConfigIndex                INTEGER (0..157),
         dsr0-TransMax                  ENUMERATED {n4, n8, n16, n32, n64, ...}
         sr1-PUCCH-ResourceIndex        INTEGER (0..2047),
         sr1-ConfigIndex                INTEGER (0..157),
         dsr1-TransMax                  ENUMERATED {n4, n8, n16, n32, n64, ...}
         sr2-PUCCH-ResourceIndex        INTEGER (0..2047),
         sr2-ConfigIndex                INTEGER (0..157),
         dsr2-TransMax                  ENUMERATED {n4, n8, n16, n32, n64, ...}
         ...
     }
}
SchedulingRequestConfig-v1020 ::=    SEQUENCE {
     sr-PUCCH-ResourceIndexP1-r10     INTEGER (0..2047)    OPTIONAL
}
-- ASN1STOP
```

Referring to Table 18, a "dsr-TransMax" field, an "sr-ConfigIndex" field, and an "sr-PUCCH-ResourceIndex" (and/or "sr-PUCCH-ResourceIndexP1") field may be defined according to respective SR types, such as an SR type 0, an SR type 1, and an SR type 2, . . . . In this case, the SR type 0 may correspond to an existing SR configuration for sending a BSR of 6 bits (i.e., an UL assignment request for sending a BSR).

The "dsr-TransMax" field is a parameter indicative of a maximum number of transmissions of an SR. An n4 value indicates four transmissions, an n8 value indicates eight transmissions, and the rest is the same.

The "sr-ConfigIndex" field indicates the value of an SR configuration index $I_{SR}$ indicative of SR periodicity $SR_{PERIODICITY}$ and an SR subframe offset $N_{OFFSET,SR}$ (refer to Table 13).

The "sr-PUCCH-ResourceIndex" and the "sr-PUCCH-ResourceIndexP1" field indicate the respective PUCCH resource indices $n_{PUCCH,SRI}^{(1,\tilde{p})}$ of antenna ports P0 and P1.

As described above, the PUCCH resource index $n_{PUCCH,SRI}^{(1,\tilde{p})}$, the SR configuration index $I_{SR}$, and the number of times that an SR is transmitted may be set for each SR type.

UE may receive information elements for configuring multiple SR types from an eNB through an RRC message. For example, UE may receive the information elements from an eNB through an RRC connection reconfiguration message or an RRC connection setup message.

SR resources correspond to the logical indices of the PUCCH formats 1/1a/1b in a one-to-one way. That is, the SR resources are assigned as in Equation 9 below.

$$n_{PUCCH}^{(1,\tilde{p})} = n_{PUCCH,SRI}^{(1,\tilde{p})}$$ [Equation 9]

As a result, this means that the resource assignment of the PUCCH formats 1 is simply multiplexed according to the multiple SR configuration.

Accordingly, a method of requesting scheduling in accordance with an embodiment of the present invention means that a plurality of SR resources is assigned to UE for each SR type and the UE sends an SR through a plurality of PUCCH resources.

Although not illustrated in Table 18, the multiple SR configuration information may also include information about the size of UL data according to each SR type (e.g., a maximum supportable size of data). For example, a maximum supportable size of data according to the SR type 1 may indicate 100 bytes (i.e., the size of data≤100), and a maximum supportable size of data according to the SR type 2 may indicate 200 bytes (i.e., 100<the size of data≤200).

Furthermore, information about the size of UL data according to each SR type may be previously set and known to both UE and an eNB.

SR resources according to SR types are described in detail below with reference to the drawings.

FIG. 22 is a diagram illustrating SR resources according to SR types in accordance with an embodiment of the present invention.

As described above, in accordance with an embodiment of the present invention, a plurality of SR resources is assigned to UE for each SR type through a multiple SR configuration.

In this case, an SR resource configured according to an SR type are determined by a combination of a PRB in which an SR is transmitted, a Cyclic Shift (CS) applied to a base sequence (e.g., a ZC sequence) for the spreading of an SR in a frequency domain, and Orthogonal Code (OC) for the spreading of the SR in a time domain.

In FIG. 22, it is assumed that in the same subframe index, an SR resource 2201 according to the SR type 1 and an SR resource 2203 according to the SR type 2 are configured in the same PRB.

In this case, an eNB may identify the SR resource 2201 according to the SR type 1 and the SR resource 2203 according to the SR type 2 based on a combination of a CS and OC.

For example, a CS index 1 and an OC index 1 may be applied to the SR resource 2201 according to the SR type 1, whereas a CS index 2 and an OC index 3 may be applied the SR resource 2203 according to the SR type 2. In this case, although the SR type 1 and the SR type 2 are simultaneously transmitted in the same PRB, an eNB is able to detect each SR by a combination of the CS and the OC.

If it is assumed that the SR resource 2201 according to the SR type 1 and the SR resource 2203 according to the SR type 2 are configured in different PRBs in the same subframe index, the eNB may identify the SR type 1 and the SR type 2 based on a PRB in which an SR is transmitted.

In addition, an SR resource configured for each SR type may be determined based on information about an SR periodicity and an SR subframe offset.

In FIG. 22, it is assumed that the SR periodicity of the SR resource 2201 according to the SR type 1 is set to 4 subframes and the SR periodicity of the SR resource 2203 according to the SR type 2 is set to 2 subframes. It is also assumed that the SR resource 2201 according to the SR type 1 and the SR resource 2203 according to the SR type 2 have the same subframe offset.

In other words, the SR resource 2201 according to the SR type 1 may be assigned to a subframe index 0, a subframe index 4, a subframe index 8, . . . . The SR resource 2203 according to the SR type 2 may be assigned to a subframe index 0, a subframe index 2, a subframe index 4, a subframe index 6, a subframe index 8, . . . .

In this case, if a subframe in which the SR resource 2201 according to the SR type 1 is transmitted overlaps with a subframe in which the SR resource 2203 according to the SR type 2 is transmitted, the eNB may attempt to detect both the SR type 1 and the SR type 2. In contrast, if a subframe in which the SR resource 2201 according to the SR type 1 is transmitted does not overlap with a subframe in which the SR resource 2203 according to the SR type 2 is transmitted, the eNB may attempt to detect any one of the SR type 1 and the SR type 2.

FIG. 23 is a diagram illustrating a method for requesting scheduling for transmitting UL data in accordance with an embodiment of the present invention.

In FIG. 23, it is assumed that a plurality of SR types has been configured as follows.

First, an SR type 1 (Type-1 SR) may be used when UE uses an SR procedure for common uplink data transmission.

Furthermore, an SR type 2 (Type-2 SR) may be used when UE uses an SR procedure for sending UL data that requires low latency, that is, UL data having a predefined size of data $L_1$ (i.e., 100<the size of data<1000).

Furthermore, an SR type 3 (Type-3 SR) may be used when UE uses an SR procedure for sending UL data that requires low latency, that is, UL data having a predefined size of data $L_2$ (i.e., 1000<the size of data<10000).

Furthermore, an SR type 4 (Type-4 SR) may be used when UE uses an SR procedure for sending UL data that requires low latency, that is, UL data having a predefined size of data $L_3$ (i.e., 10000<the size of data<20000).

A process of assigning uplink resources to the SR type 1, the SR type 2, and the SR type 3 is described below.

UE in which a multiple SR configuration has been configured sends a scheduling request to an eNB in order to be assigned PUSCH resources for sending UL data at step 2301, 2311, and 2317.

In this case, the UE sends an SR type, selected based on the type of UL data to be transmitted on a PUCCH and/or the size of the UL data, to the eNB.

As described above, an SR type transmitted by the UE is determined based on a resource in which an SR is transmitted. That is, the UE sends the SR to the eNB through an SR resource corresponding to the selected SR type.

Such an SR resource (i.e., a multiple SR configuration) may be set by a high layer (e.g., an RRC layer) in a UE-specific way or a cell-specific way. Furthermore, the multiple SR configuration may be dynamically or semi-statically changed.

In the example of FIG. 23, when the UE sends the SR through an SR resource corresponding to the SR type 1, the eNB may determine the received SR to be the SR type 1. Likewise, when the UE sends the SR through an SR resource corresponding to the SR type 2, the eNB may determine the received SR to be the SR type 2.

The eNB determines the SR type based on the SR resource received from the UE and performs a process of assigning uplink resources based on the determined SR type.

First, if the UE sends the SR type 1 to the eNB, the eNB may perform a common 5-step UL resource assignment procedure by detecting energy (i.e., detecting on/off) in the resource of the SR type 1.

That is, as in the example of FIG. 18(a), the eNB sends an UL grant for a PUSCH resource for sending a BSR to the UE at step 2303.

The UE that has received the UL grant for the BSR from the eNB sends a BSR, triggered through the PUSCH resources assigned by the UL grant, to the eNB at step 2305.

The eNB checks the amount of data to be actually transmitted in uplink by the UE based on the BSR and sends an UL grant for a PUSCH resource for sending the actual data to the UE at step 2307. In this case, the eNB sets up a soft buffer size corresponding to the size of the actual data to be transmitted in uplink by the UE based on the BSR.

The UE that has received the UL grant for sending the actual data from the eNB sends the actual UL data to the eNB through the assigned PUSCH resource at step 2309.

Thereafter, when the UE sends the SR type 2 to the eNB, the eNB may perform a 3-step UL resource assignment procedure without a BSR request (i.e., without UL resource assignment for a BSR and without sending the BSR) by detecting energy (i.e., detecting on/off) in the resource of the SR type 2.

That is, the eNB sends an uplink grant (i.e., an UL grant) for a PUSCH resource for sending actual data to the UE at step 2313.

In this case, the PUSCH resource assigned to send the actual data may be determined based on information about the size of the data that has been provided from the UE to the eNB through the SR type 2 at step 2311, the size of data $L_1$ (100<size of data<1000). Furthermore, the eNB sets up a soft buffer size (e.g., 3000=1000*3) corresponding to the size of data $L_1$.

The UE sends the actual data to the eNB through the PUSCH resource assigned by the UL grant from the eNB at step 2315.

Thereafter, when the UE sends the SR type 3 to the eNB, the eNB may perform a 3-step UL resource assignment procedure without a BSR request (i.e., without UL resource assignment for a BSR and without sending the BSR) by detecting energy (i.e., detecting on/off) in the resource of the SR type 3.

That is, the eNB sends an uplink grant (i.e., an UL grant) for the PUSCH resource for sending the actual data to the UE at step 2317.

In this case, the PUSCH resource assigned to send the actual data may be determined based on information about the size of the data that has been provided from the UE to the eNB through the SR type 3 at step 2317, that is, the size of data $L_2$ (1000<the size of data<10000). Furthermore, the eNB sets up a soft buffer size (e.g., 30000=3*10000) corresponding to the size of data $L_2$.

The UE sends the actual data to the eNB through the PUSCH resource assigned by the UL grant from the eNB at step 2321.

Processing in UE and an eNB for UL data transmission using a multiple SR configuration is described in detail below with reference to the drawings.

FIG. 24 is a diagram illustrating a process of sending UL data using a multiple SR configuration in accordance with an embodiment of the present invention.

In FIG. 24, it is assumed that major applications that generate UL data include three cases as follows.

Case 1—data of a specific criterion or less size that is intermittently/aperiodically generated (e.g., health care and traffic safety information)

Case 2—data of various sizes that is generated intermittently/aperiodically

Case 3—data other than Case 1 and Case 2

In the case of Case 3, the common 5-step SR-based uplink resource assignment process is performed.

Processing in UE and the eNB in "Case 1" and "Case 2" is described below.

FIG. 24(a) illustrates an UL data transmission process in Case 1.

An embodiment of the present invention proposes a new scheduling request method not including a BSR in order to send data of a small size that may be intermittently generated more rapidly as in "Case 1."

In the case of data of a small size when an event is intermittently generated as in "Case 1", data may be transmitted through the proposed 3-step SR procedure not including a BSR.

In this case, an eNB previously defines a maximum supportable size of data $L_1$ regardless of the type and size of data transmitted by UE and defines a corresponding soft buffer size.

A maximum supportable size of data that may be used by each of pieces of UE may be controlled through an RRC message. Furthermore, information about an SR resource corresponding to each SR type may also be controlled through an RRC message.

Referring to FIG. 24(a), UE determines whether the size of data transmitted in uplink is a specific length $L_1$ or less (or less than the specific length $L_1$) supported in a multiple SR configuration at step 2401.

The UE selects an SR type "j" according to the size of the data at step 2403. That is, if the size of the data is $L_1$ or less (or less than), the UE selects the SR type 1. If not, the UE selects the SR type 0. The opposite is also possible.

Furthermore, the UE sends the selected SR type 0 or 1 to the eNB through a PUCCH resource corresponding to a corresponding SR type at step 2405.

The eNB performs an UL grant generation and soft buffer configuration for assigning the resources of UL data based on the size of data obtained by detecting the SR of the UE at step 2407.

More specifically, the eNB obtains information about the size of the data (i.e., $L_1$ or less) based on the received SR type, generates an UL grant according to the size of the data, and sends the UL grant to the UE. Furthermore, the eNB sets up a soft buffer size corresponding to the size of the data. In this case, the eNB may set up a soft buffer size corresponding to the maximum supportable size of data (i.e., $L_1$).

If the size of the data satisfies a predetermined condition (i.e., the size of data<$L_1$) as described above, the UE may send the UL data using a fast UL resource assignment procedure.

FIG. 24(b) illustrates an UL data transmission process in Case 2.

An embodiment of the present invention proposes a new scheduling request method not including a BSR in order to send data of various sizes that may be intermittently generated as in "Case 2" more rapidly.

The present embodiment corresponds to a case where an event is intermittently generated as in "Case 1", but data may be transmitted using the aforementioned 3-step SR procedure not including a BSR through two or more multiple SR configurations because data has various sizes.

In this case, an eNB previously defines a maximum supportable size of data $L_i$ (i=1, 2, 3, . . . , M) corresponding to each SR type and defines a corresponding soft buffer size.

Multiple SR configurations based on various sizes of data that may be used by pieces of UE may be controlled through an RRC message. That is, an M value may be controlled in order to control a number on which the size of data is determined. Furthermore, the size of data supportable for each SR type and information about an SR resource may also be controlled through an RRC message.

Referring to FIG. 24(b), UE determines that the size of data transmitted in uplink corresponds to which range ($L_a$<the size of data<$L_b$, wherein "a" and "b" belong to "i") of sizes of data correspond to respective SR types supported in a multiple SR configuration at step 2409.

The UE selects an SR type "j" according to the size of the data at step 2411. That is, the UE selects a corresponding SR type depending on whether the size of data belongs to which data range ($L_a$<the size of data<$L_b$, wherein "a" and "b" belong to "i").

Furthermore, the UE sends the selected SR type to an eNB through a PUCCH resource corresponding to the selected SR type at step 2413.

The eNB performs an UL grant generation and soft buffer configuration for assigning the resources of UL data based on the size of data obtained detecting the SR of the UE at step 2415.

More specifically, the eNB obtains information about the size of the data ($L_a$<the size of data<$L_b$, wherein "a" and "b" belong to "i") based on the received SR type, generates an UL grant according to the size of the data, and sends the UL grant to the UE. Furthermore, the eNB sets up a soft buffer size corresponding to the size of the data. In this case, the eNB may set up a soft buffer size corresponding to the maximum supportable size of data (i.e., $L_b$).

If the size of the data satisfies a predetermined condition (i.e., $L_a$<the size of data<$L_b$) as described above, the UE may send the UL data using a fast UL resource assignment procedure.

FIG. 25 is a diagram illustrating a method for requesting scheduling for transmitting UL data in accordance with an embodiment of the present invention.

Referring to FIG. 25, UE receives multiple SR configuration information from an eNB at step 2501.

The multiple SR configuration information includes information about a PUCCH resource index (i.e., an SR resource) corresponding to each SR type. The SR resource configured for each SR type is determined by a combination of a PRB in which an SR is transmitted, a CS applied to a base sequence (e.g., a ZC sequence) for spreading the SR in a frequency domain, and OC for spreading the SR in a time domain. Furthermore, the SR resource configured for each SR type may further include information about an SR periodicity and an SR subframe offset.

Furthermore, the multiple SR configuration information may include information about the size of UL data corresponds to each SR type (e.g., a maximum supportable size of data) or a maximum number of times that an SR is transmitted.

The UE may receive the multiple SR configuration information from the eNB through an RRC message. For example, the UE may receive the multiple SR configuration information from the eNB through an RRC connection reconfiguration message or an RRC connection setup message.

Such multiple SR configuration information may be previously set between the UE and the eNB and known to both the UE and the eNB. In this case, step 2501 may be omitted.

The UE selects an SR type that belongs to multiple SR types and that corresponds to the size of UL data to be transmitted to the eNB at step 2503.

At least any one of the index of a physical uplink control channel (PUCCH) resource, an SR periodicity, or an SR subframe offset for sending an SR may be different set according to each of the multiple SR types.

Furthermore, the size of UL data is determined for each SR type. For example, a maximum supportable size of data may be differently determined for each SR type. The UE checks the size of the UL data to be transmitted to the eNB and selects an SR type according to the range of the checked size of data.

The UE sends the selected SR type to the eNB in order to be assigned a PUSCH resource for sending the UL data at step 2505.

In this case, SRs corresponding to the respective SR types are transmitted using an on/off keying method, but the index of PUCCH resources according to the SR types are differently set. That is, the UE sends an SR to the eNB through an SR resource (i.e., a PUCCH resource index) that has been set in the SR type corresponding to the UL data to be transmitted.

The eNB attempts to detect all the SR types configured in the UE.

If the SR type transmitted by the UE indicates a procedure for assigning uplink resources through the transmission of an existing BSR of 6 bits at step 2405 (i.e., if the SR corresponds to an SR type for sending a BSR), the UE receives an UL grant for sending a BSR from the eNB at step 2507.

The UE that has received the UL grant for the BSR from the eNB sends a triggered BSR to the eNB through a PUSCH resource assigned by the received UL grant at step 2509.

In this case, if the SR type transmitted by the UE does not indicate a procedure for assigning uplink resources through the transmission of an existing BSR of 6 bits, step 2507 and step 2509 may be omitted.

The eNB obtains information about the size of the UL data through the SR type received from the UE at step 2511.

The eNB identifies the SR type through a resource in which the SR is transmitted and obtains information about the size of the UL data to be transmitted by the UE in uplink using the SR type.

When the eNB receives a BSR from the UE after step 2507 and step 2509 are performed, the eNB may obtain information about the size of UL data to be actually transmitted by the UE in uplink through the received BSR.

The UE receives an UL grant for the PUSCH resource for sending the UL data from the eNB at step 2513.

That is, the eNB checks the size of the UL data to be actually transmitted by the UE in uplink through the received SR type (or BSR) and sends the UL grant for the PUSCH resource for sending the actual data to the UE. Furthermore, the eNB sets up a soft buffer size corresponding to the size of the UL data to be transmitted by the UE in uplink based on the received SR type (or BSR).

The UE that has received the UL grant for sending the actual data from the eNB sends the actual UL data to the eNB through the PUSCH resource assigned by the UL grant at step 2515.

As described above, in the scheduling method in accordance with an embodiment of the present invention, the existing 5-step UL resource assignment procedure or the 3-step UL resource assignment procedure may be performed according to an SR type transmitted by UE because a plurality of SR types is configured in the UE without changing the existing PUCCH formats. Furthermore, the existing 5-step scheduling request procedure can be reduced to the 3-step scheduling request procedure.

Furthermore, the scheduling method in accordance with an embodiment of the present invention is advantageous in that a collision is not generated between PUCCH ACK/NACK resources. If a multiple SR configuration overlaps with an existing SR, an existing SR+A/N multiplexing scheme is used without any change.

Furthermore, in the scheduling method in accordance with an embodiment of the present invention, a scheduling request according to the conventional 5-step UL resource assignment procedure can be reduced to 3 steps. In the proposed method, since a BSR is omitted through the multiple SR configuration, UE can directly set a soft buffer for the assignment of an UL grant and UL data with respect to data to be transmitted by the UE in uplink immediately after a scheduling request.

Apparatus for Implementing the Present Invention

FIG. 26 is a block diagram of a wireless communication apparatus according to an embodiment of the present invention.

Referring to FIG. 26, a wireless communication system includes an eNB 2610 and a plurality of UEs 2620 belonging to the eNB 2610.

The eNB 2610 includes a processor 2611, a memory 2612, a radio frequency (RF) unit 2613. The processor 2611 may be configured to implement the functions, procedures and/or methods proposed by the present invention as described in FIGS. 1-25. Layers of a wireless interface protocol may be implemented by the processor 2611. The memory 2612 is connected to the processor 2611 and stores various types of information for operating the processor 2611. The RF unit 2613 is connected to the processor 2611, transmits and/or receives an RF signal.

The UE 2620 includes a processor 2621, a memory 2622, and an RF unit 2623. The processor 2621 may be configured to implement the functions, procedures and/or methods proposed by the present invention as described in FIGS. 1-25. Layers of a wireless interface protocol may be implemented by the processor 2621. The memory 2622 is connected to the processor 2611 and stores information related to operations of the processor 2622. The RF unit 2623 is connected to the processor 2611, transmits and/or receives an RF signal.

The memories 2612 and 2622 may be located inside or outside the processors 2611 and 2621 and may be connected to the processors 2611 and 2621 through various well-known means. The eNB 2610 and/or UE 2620 may include a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the method for requesting scheduling for transmitting UL data in the wireless communication system of the present invention is described mainly for the example applied to 3GPP LTE/LTE-A system, it is also possible to be applied to various wireless communication system as well as 3GPP LTE/LTE-A system.

What is claimed is:

1. A method of requesting scheduling for transmission of uplink (UL) data in a wireless communication system, the method performed by a user equipment (UE) and comprising:
receiving information for multiple scheduling request (SR) types from an eNode B (eNB) for configuring the multiple SR types;
transmitting an SR to the eNB through an SR resource selected from a plurality of SR resources corresponding to the multiple SR types;
receiving an UL grant from the eNB according to one of the multiple SR types; and
transmitting UL data to the eNB through a physical uplink shared channel (PUSCH) resource allocated by the UL grant,
wherein the information for the multiple SR types includes at least information related an index of a physical uplink control channel (PUCCH) resource, an SR periodicity, or an SR subframe offset corresponding to each of the multiple SR types.

2. The method of claim 1, wherein at least an index of the PUCCH resource, the SR periodicity, or the SR subframe offset is configured differently according to each of the multiple SR types.

3. The method of claim 1, wherein a size of the UL data is determined for each of the multiple SR types.

4. The method of claim 3, wherein the allocated PUSCH resource is determined based on the size of the UL data according to a selected one of the multiple SR types.

5. The method of claim 3, wherein a size of a soft buffer set by the eNB is determined based on the size of the UL data according to a selected one of the multiple SR types.

6. The method of claim 1, wherein a resource allocation procedure for transmitting the UL data is determined according to the multiple SR types.

7. The method of claim 1, further comprising:
receiving an UL grant from the eNB for transmitting a Buffer Status Report (BSR) if the SR is for sending the BSR; and
transmitting the BSR to the eNB through a PUSCH resource allocated by the received UL grant.

8. A user equipment (UE) requesting scheduling for transmission of uplink (UL) data in a wireless communication system, the UE comprising:
a transceiver configured to transmit and receive radio signals; and
a processor configured control the transceiver to:
control the transceiver to receive information for multiple scheduling request (SR) types from an eNode B (eNB) for configuring the multiple SR types;
control the transceiver to transmit an SR to the eNB through an SR resource selected from a plurality of SR resources corresponding to the multiple SR types;
control the transceiver to receive an UL grant from the eNB according to one of the multiple SR types; and
control the transceiver to transmit UL data to the eNB through a physical uplink shared channel (PUSCH) resource allocated by the UL grant,
wherein the information for the multiple SR types includes at least information related an index of a physical uplink control channel (PUCCH) resource, an SR periodicity, or an SR subframe offset corresponding to each of the multiple SR types.

9. The UE of claim 8, wherein at least an index of the PUCCH resource, the SR periodicity, or the SR subframe offset is configured differently according to each of the multiple SR types.

10. The UE of claim 8, wherein a size of the UL data is determined for each of the multiple SR types.

11. The UE of claim 10, wherein the PUSCH resource is determined based on the size of the UL data according to the selected one of the multiple SR types.

12. The UE of claim 10, wherein a size of a soft buffer set by the eNB is determined based on the size of the UL data according to a selected one of the multiple SR types.

13. The UE of claim 8, wherein a resource allocation procedure for transmitting the UL data is determined according to the multiple SR types.

14. The UE of claim 8, wherein the processor is further configured to:
control the transceiver to receive an UL grant from the eNB for transmitting a Buffer Status Report (BSR) if the SR is for sending the BSR; and
control the transceiver to transmit the BSR to the eNB through a PUSCH resource allocated by the received UL grant.

* * * * *